United States Patent
Oya et al.

(10) Patent No.: US 6,589,649 B2
(45) Date of Patent: Jul. 8, 2003

(54) BIAXIALLY ORIENTED POLYESTER FILM, ADHESIVE FILM AND COLORED HARD COATING FILM

(75) Inventors: Taro Oya, Kanagawa (JP); Masayuki Fukuda, Gifu (JP); Makoto Handa, Kanagawa (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/182,204

(22) PCT Filed: Aug. 13, 2001

(86) PCT No.: PCT/JP01/06979

§ 371 (c)(1), (2), (4) Date: Jul. 26, 2002

(87) PCT Pub. No.: WO02/16497

PCT Pub. Date: Feb. 28, 2002

(65) Prior Publication Data

US 2003/0008162 A1 Jan. 9, 2003

(30) Foreign Application Priority Data

Aug. 23, 2000 (JP) ........................................ 2000-252174
Feb. 28, 2001 (JP) ........................................ 2001-054038

(51) Int. Cl.⁷ .......................... B32B 27/08; B32B 27/18; B32B 27/20; B32B 27/36; G02B 5/22
(52) U.S. Cl. .................. 428/343; 428/480; 428/910; 428/217; 313/461; 313/466; 313/112; 313/371; 313/479; 359/885; 359/601; 359/614
(58) Field of Search ................ 428/343, 480, 428/910, 217; 313/461, 466, 112, 371, 479; 359/885, 601, 614

(56) References Cited

U.S. PATENT DOCUMENTS 4,376,829 A   3/1983 Daiku
4,755,716 A * 7/1988 Hayafune et al. ........... 313/478
5,200,667 A * 4/1993 Iwasaki et al. .............. 313/478
5,523,114 A * 6/1996 Tong et al. .................... 427/68
5,806,834 A   9/1998 Yoshida
5,972,517 A * 10/1999 Kondo et al. ................ 428/446
6,165,546 A * 12/2000 Teng et al. ............... 427/163.1
6,366,012 B1 * 4/2002 Lee et al. ..................... 313/466
6,479,928 B1 * 11/2002 Lee et al. ..................... 313/461

FOREIGN PATENT DOCUMENTS

EP   1 007 469 A2  *  2/2001
JP   58-153904 A       9/1983
JP   11-335639 A      12/1999

OTHER PUBLICATIONS

Article "Gekkan Display", vol. 58 (published by Techno Times Ltd., the Apr. No., 2000), pp. 72 to 77.

* cited by examiner

Primary Examiner—Vivian Chen
(74) Attorney, Agent, or Firm—Sughrue Mion, PLLC

(57) ABSTRACT

A biaxially oriented polyester film, an adhesive film, or a colored hard coat film for application to CRT or liquid crystal display devices to improve contrast and color purity, characterized in that the film contains a coloring matter; (1) a wavelength (X) of the maximum absorption peak of light in wavelengths of 540 to 630 nm is in the range of 560 to 610 nm; (2) a half band width of the maximum absorption peak of the light is not more than 80 nm; a value ($T_x/T_{540}$), obtained by dividing a light transmittance ($T_x$) at the wavelength (X) by a light transmittance ($T_{540}$) at a wavelength of 540 nm, is less than 0.80; a value ($T_{620}/T_{540}$), obtained by dividing a light transmittance ($T_{620}$) at the wavelength of 620 nm by a light transmittance ($T_{540}$) at a wavelength of 540 nm, is in the range of 0.5 to 1.5; and a value ($T_{450}/T_{540}$), obtained by dividing a light transmittance ($T_{450}$) at the wavelength of 450 nm by a light transmittance ($T_{540}$) at a wavelength of 540 nm, is in the range of 0.5 to 1.5.

24 Claims, 3 Drawing Sheets

Wavelength[nm]

BIAXIALLY ORIENTED POLYESTER FILM, ADHESIVE FILM AND COLORED HARD COATING FILM

TECHNICAL FIELD

The present invention relates to a biaxially oriented polyester film, an adhesive film and a colored hard coat film. In more retail, the present invention relates to a biaxially oriented polyester film, an adhesive film, and a colored hard coat film, which are suitable for being adhered to the display surfaces of electronic displays such as CRTs and liquid crystal display devices and then for being used.

BACKGROUND ART

The CRT displays and the like of televisions and personal computers emit three lights consisting of blue light, green light and red light to display images. However, the displays and the like further emit neutral color lights between the blue light and the green light and between the green light and the red light, respectively, and have caused a problem that the hue contrasts of the images have been blurred by the neutral color lights. Thereby, the solution of the problem has strongly be desired, because the states, that personal computers are watched for long times, have been increased according to the rapid popularization of the personal computers.

As a measure for the problem, it was proposed, in JP-A 11-335639 (1999) (hereinafter, JP-A means "Japanese Unexamined Patent Application".), that carbon black was added to an adhesive layer when a protecting film comprising a protecting layer and the adhesive layer was adhered to an image display surface. The above JP-A is disclosing that the hue contrasts of images become clear, because the light absorbance of the adhesive layer is evenly increased over the each wavelength of the visible light zone due to the carbon black contained in the adhesive layer, and thereby the transmission of the neutral color lights between the blue light and the green light and between the green light and the red light, respectively, can be restrained. However, such an evenly lowering method of the transmittance, as the method in said JP-A, has a defect that the light quantity itself of a cathode-ray tube is decreased, consequently lowering the brightness of the cathode-ray tube.

As a method for solving the problem that the brightness of the cathode-ray tube is lowered, it has been proposed in JP-A 58-153904 (1983) to use color filters for giving selectivity to the transmittance of the visible light to improve the contrast and color purity. A similar method for plasma displays has been also proposed in Gekkan Display Vol. 58 (published by Techno Times Ltd., the April number, 2000), page 72 to 77. However, these color filters are not integrating-type color filters with cathode-ray tubes but attaching-type color filters to the outer surfaces. Therefore, since an air layer exists between a cathode-ray tube and an outer surface filter, there have been the defects that it is very difficult to control the reflectivity of outer light and the visibility is liable to be lowered by the outer light.

In addition, it is proposed in JP-A 57-5251 (1982) to add a pigment to the glass of a cathode-ray tube and then to use the obtained glass having selective absorption for the visible light. However, the method is now not commercialized, because the production cost of the glass is very high. Additionally, since the glass thickness of a flattened cathode-ray tube, which is being increased in recent years, is largely different between the central portion and the peripheral portions of the tube, it is extremely difficult to give uniform selective absorbability according to the addition method as described in the JP-A.

Hence, it has strongly been desired to provide an optical protection film which can be adhered to the image display surface of a CRT, a liquid crystal display device and the like to improve the contrast and color purity without lowering the brightness, in order to overcome the above-described defects. Further, for the optical protection film, the following improvements have strongly been desired; the simplification of processes, the improvement in the handleability of the adhesive layer, the improvement of transparency, the prevention in the deterioration of visibility due to outside light, the improvement of wear resistance, and the prevention in the delamination among the layers constituting the protection film, in addition to the improvement of the contrast and color purity without deteriorating the brightness of an image display device.

DISCLOSURE OF THE INVENTION

An object of the present invention is to provide a biaxially oriented polyester film which can solve the above-described problems and improve the contrast and the color purity without deteriorating the brightness.

Further, another object of the present invention is to provide an adhesive film which can improve the contrast and the color purity without deteriorating the brightness and further to improve delamination resistance among the layers.

Furthermore, another object of the present invention is to provide a colored hard coat film which can improve the contrast and the color purity, without deteriorating the brightness, and improve delamination resistance.

The further other objects and advantages of the present invention will be clarified by the following explanation.

According to the present invention, firstly, the above-described objects and advantages of the present invention are achieved with a biaxially oriented polyester film characterized in that (1) said film contains a coloring matter;

(2) a haze value of said film is at most 5%;

(3) a wavelength (X) of the maximum absorption peak of light in wavelengths of 540 to 630 nm is in the range of 560 to 610 nm;

(4) a half band width of the maximum absorption peak of light in wavelengths of 540 to 630 nm is not more than 80 nm;

(5) a value ($T_x/T_{540}$), obtained by dividing a light transmittance ($T_x$) at the wavelength (X) of the maximum absorption peak of light in wavelengths of 540 to 630 nm by a light transmittance ($T_{540}$) at a wavelength of 540 nm, is less than 0.80;

(6) a value ($T_{620}/T_{540}$), obtained by dividing a light transmittance ($T_{620}$) at the wavelength of 620 nm by a light transmittance ($T_{540}$) at a wavelength of 540 nm, is in the range of 0.5 to 1.5;

(7) a value ($T_{450}/T_{540}$), obtained by dividing a light transmittance ($T_{450}$) at the wavelength of 450 nm by a light transmittance ($T_{540}$) at a wavelength of 540 nm, is in the range of 0.5 to 1.5; and (8) said film is a base film for a colored hard coat film to be laminated to an image display surface.

According to the present invention, secondly, the above-described objects and advantages of the present invention are achieved with an adhesive film comprising the biaxially oriented polyester film of the present invention and the first adhesive layer disposed on one side of the biaxially oriented polyester film.

In addition, according to the present invention, thirdly, the above-described objects and advantages of the present invention are achieved with a colored hard coat film characterized in that (1) said colored hard coat film comprises a transparent substrate film and a hard coat layer disposed on one side of the substrate film;
(2) said colored hard coat film contains a coloring matter;
(3) a wavelength (X) of the maximum absorption peak of light in wavelengths of 540 to 630 nm is in the range of 560 to 610 nm;
(4) a half band width of the maximum absorption peak of light in wavelengths of 540 to 630 nm is not more than 80 nm;
(5) a value ($T_x/T_{540}$), obtained by dividing a light transmittance ($T_x$ at the wavelength (X) of the maximum absorption peak of light in wavelengths of 540 to 630 nm by a light transmittance ($T_{540}$) at a wavelength of 540 nm, is less than 0.80;
(6) a value ($T_{620}/T_{540}$), obtained by dividing a light transmittance ($T_{620}$) at the wavelength of 620 nm by a light transmittance ($T_{540}$) at a wavelength of 540 nm, is in the range of 0.5 to 1.5;
(7) a value ($T_{450}/T_{540}$), obtained by dividing a light transmittance ($T_{450}$) at the wavelength of 450 nm by a light transmittance ($T_{540}$) at a wavelength of 540 nm, is in the range of 0.5 to 1.5; and
(8) said colored hard coat film is a hard coat film to be laminated to an image display surface.

MODE FOR CARRYING OUT THE INVENTION

Figure 1:
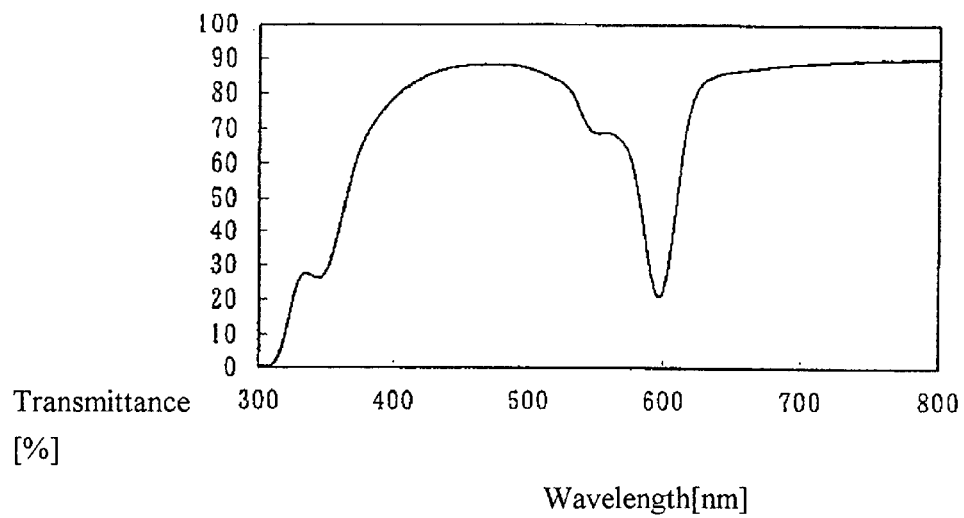
FIG. 1 is an example of transmittance curves which the optical biaxially oriented polyester film of the present invention shows.
Figure 2:
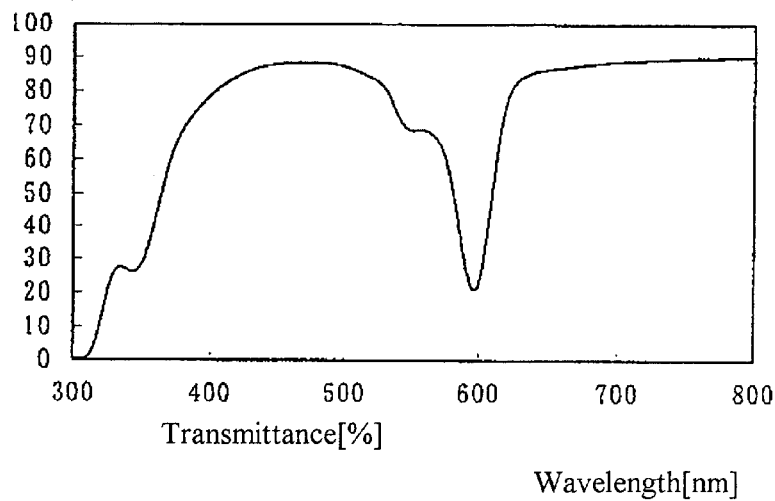
FIG. 2 is an example of transmittance curves which the optical colored hard coat film of the present invention shows.
Figure 3:
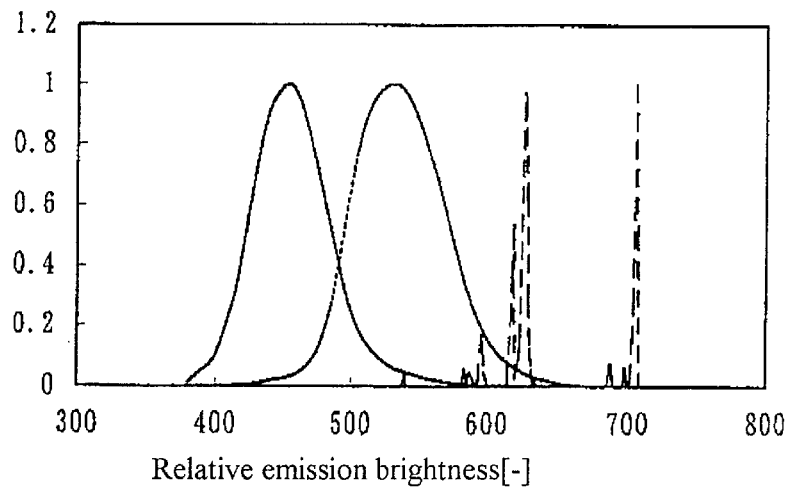
FIG. 3 is a graph showing the emission spectra of blue, green and red fluorescent substances, respectively, on the fluorescent substance screen of a cathode-ray tube.

Observing the relation of the intensities of the luminescent colors to the wavelengths of light, of a CRT and the like, three peaks of blue, green and red colors exists from the short wavelength side. A problem is that the skirts of blue and green color peaks and the skirts of green and red color peaks overlap each other, respectively. Therefore, even when only the blue color or only the green color is developed, a neutral color between the blue color and the green color is somewhat developed, or when only the green color or only the red color is developed, a neutral color between the green color and the red color, namely a yellowish color, is somewhat developed. The neutral colors deteriorate the contrasts and color purities of images. Since human eyes are especially highly sensitive to the neutral color between the green color and the red color, the neutral color between the green color and the red color particularly deteriorates the contrasts and color purities of images. Since the human eyes are low sensitive to the neutral color between the blue color and the green color, the neutral color between the green color and the red color improves the color purity, but does not have a large effect on the point of the contrast. Therefore, in the present invention, a coloring matter or the like is added into a hard coat film to be adhered to an image display surface or a biaxially oriented polyester film composing the hard coat film, thereby lowering the light transmittance in a region corresponding to the neutral color between the green color and the red color to prevent the transmission of the superposed portion of the green color and the red color.

Hereinafter, first, the biaxially oriented polyester film of the present invention will be described in detail.

The biaxially oriented polyester film of the present invention is characterized in that, in order to prevent the transmission of light in the overlapped portion of the green color and the red color among the above-described three primary colors, the wavelength of the maximum absorption peak of light in wavelengths of 540 to 630 nm is in the range of 560 to 610 nm. When the wavelength of said maximum absorption peak is below 560 nm or above 610 nm, the green or red color light itself is much absorbed, and the improvements of the contrast and color purity can thereby not be desired. The preferable wavelengths of said maximum absorption peak are 570 nm to 600 nm. Hereinafter, X is sometimes referred to as the wavelength of the maximum absorption peak of the light in wavelengths of 540 to 630 nm.

The biaxially oriented polyester film of the present invention is characterized in that, in order to prevent the transmission of light in the overlapped portion of the green color and the red color among the above-described three primary colors, the half band width of the maximum absorption peak of light in wavelengths of 540 to 630 nm is not more than 80 nm. When the half value width of said maximum absorption peak is above 80 nm, the red or green color light itself is much absorbed, and the improvements of the contrast and color purity can thereby not be desired. The preferable half value width of the maximum absorption peak is not more than 60 nm, further preferably not more than 50 nm, and extremely preferably not more than 40 nm. On the other hand, the lower limit of the half value width of the maximum absorption peak is preferably at least 10 nm, because of capable of corresponding to a wide range of display devices.

The biaxially oriented polyester film of the present invention is characterized in that, in order to improve the contrast and the color purity, the light transmittance ($T_x$), at the light of the wavelength (X) of the maximum absorption peak in the lights of said wavelengths of 540 to 630 nm, must be less than 0.80, as compared with the light transmittance ($T_{540}$) at the light of a wavelength of 540 nm. Hereinafter, $T_x$ is sometimes referred to as a transmittance in light having the wavelength (X), and $T_{540}$ is also sometimes referred to as a transmittance in light having a wavelength of 540 nm. When $T_x/T_{540}$ is not less than 0.80, the absorption of the neutral color between the red color and the green color is insufficient, whereby the improvements of the contrast and the color purity can not be desired. $T_x/T_{540}$ is preferably less than 0.60, more preferably less than 0.40. The less the lower limit of $T_x/T_{540}$ is, the better. Therefore, the lower limit of $T_x/T_{540}$ is not limited, but $T_x/T_{540}$ is preferably not less than 0.05, more preferably not less than 0.10, because the excessive addition of the coloring matter is not necessary.

Since the biaxially oriented polyester film of the present invention contains the coloring matter to selectively absorb visible light, the film is liable to deviate the development of colors, and it is therefore important to control the deviation of hue (chroma) as much as possible so as not to change originally projected colors. In order to control the deviation of the hue, it is desirable that light transmittances ($T_{450}$, $T_{540}$ and $T_{620}$) at the wavelengths, 450 nm, 540 nm and 620 nm, of red, green, and blue colors are approximately equivalent to each other. Hereinafter, $T_{450}$ is sometimes referred to as a transmittance in light having the wavelength 450 nm, and $T_{540}$ is also sometimes referred to as a transmittance in light having the wavelength 540 nm. Further, $T_{620}$ is sometimes referred to as a transmittance in light having the wavelength 620 nm. The biaxially oriented polyester film is characterized in that $T_{450}/T_{540}$ and $T_{620}/T_{540}$ are in ranges of 0.5 to 1.5, respectively, to control the deviation of the hue. When $T_{450}/T_{540}$ or $T_{620}/T_{540}$ is less than 0.5 or more than 1.5, the chromaticity of light emitted from a cathode-ray tube is enlarged to deteriorate visibility. The upper limits and lower limits of $T_{450}/T_{540}$ and $T_{620}/T_{540}$ are preferably 1.3 and 0.7, respectively. Further preferably, the upper limits and lower limits of $T_{450}/T_{540}$ and $T_{620}/T_{540}$ are 1.2 and 0.8, respectively.

The biaxially oriented polyester film of the present invention is characterized in that the haze value of said film is not more than 5%. When the haze value is larger than 5%, the hue of an image becomes cloudy, thereby lacking good sharpness to deteriorate visibility. The coloring matter to be added in the present invention includes dyes and pigments, and the dyes are preferable, because the haze value can easily be controlled to not more than 5%. The dyes are preferable from the purpose for selectively removing only the neutral light, because the light-absorbing mechanisms of the dyes are different from those of the pigments and do not diffuse light. When the pigment is used as the coloring matter, it is preferable to select a pigment having a small particle diameter, because the pigment is liable to give a haze value of not more than 5%. The especially preferable average particle diameter of the pigment is in the range of 50 to 500 nm.

The biaxially oriented polyester film of the present invention contains a coloring matter which selectively absorbs the neutral color between the red color and the green color. A coloring matter hardly causing the change and deterioration thereof at temperature of not more than 330° C. is preferable as the coloring matter to be added to the film under the consideration of the heat history until the final product. The preferable coloring matter used in the present invention includes anthraquinone-based coloring matters, quinacridone-based coloring matters, perinone-based coloring matters, polymethine-based coloring matters, pyrromethene-based coloring matters, porphyrin-based coloring matters and phthalocyanine-based coloring matters. The addition amount of the coloring matter is preferably 0.004 to 0.420 g/m², further preferably 0.004 to 0.200 g/m², based on the area of the biaxially oriented polyester film, namely the surface vertical to the thickness direction of the biaxially oriented polyester film. When said addition amount is less than 0.004 g/m² or more than 0.420 g/m², it is difficult to satisfy light transmission characteristics in the above-described visible light.

The method for adding the coloring matter in the present invention includes a method comprising dispersing or dissolving the coloring matter in ethylene glycol or the like and then adding the obtained dispersion or solution at a polymerization step and a method comprising preparing the pellets of a polyester resin containing the coloring matter in a higher concentration than the concentration of the coloring matter added to the film or the molten and solidified pellets of the coloring matter, itself, and then adding and mixing the pellets with a polyester. The latter method is preferable from viewpoints comprising the productivity of the film, the prevention in the contamination of a foreign matter and the simplification of the processes. When the dye is melted and then solidified, a binder may suitably be added. As a mixing method, it is especially preferable to add the melted and solidified pellets of the dye to the pellets of the polyester by the use of a small feeder, because the mechanical properties of the dye pellets are different from those of the pellets of the polyester resin. As the property of the coloring matter to be added to the polyester, a property, that is scarcely causing the lowering of the viscosity of the polyester on the extrusion of the polyester, is preferable from the viewpoint of productivity. Additionally, in order to control the lowering in the viscosity of the melted polyester resin, the polyester is preferably extruded at an extruder shear deformation rate of about 70 (1/second) for a retention time of 20 to 4,000 seconds. When the retention time is less than 20 seconds, the kneading of the dye is insufficient, and the irregularity of coloration appears. On the other hand, the breakage is easily caused due to the lowering of the viscosity, when the retention time exceeds 4,000 seconds.

The polyester constituting the biaxially oriented polyester film of the present invention is a linear saturated polyester synthesized from an aromatic dibasic acid or its ester-forming derivative and a diol or its ester-forming derivative. The concrete examples of such the polyester include polyethylene terephthalate, polyethylene isophthalate, polypropylene terephthalate, polybutylene terephthalate, poly(1,4-cyclohexylenedimethylene terephthalate), and polyethylene 2,6-naphthalenedicarboxylate, and further include the copolymers and blended products of the polyesters. Among them, a polyester containing polyethylene terephthalate or polyethylene 2,6-naphthalenedicarboxylate in an amount of not less than 70 percent by weight based on the weight of the polyester is preferable, and, in particular, polyethylene terephthalate containing ethylene terephthalate units as main repeating units is preferable from good processability and transparency when processed into a biaxially oriented polyester film.

Copolymerization components in said polyethylene terephthalate include aromatic dicarboxylic acids such as isophthalic acid, phthalic acid and 2,6-naphthalenedicarboxylic acid, aliphatic dicarboxylic acids such as adipic acid, azelaic acid, sebacic acid, and decanedicarboxylic acid, and alicyclic dicarboxylic acids such as cyclohexanedicarboxylic acid as dicarboxylic acid components, and aliphatic diols such as 1,4-butanediol, 1,6-hexanediol, and diethylene glycol, alicyclic diols such as 1,4-cyclohexanedimethanol, and aromatic diols such as bisphenol A as diol components. The copolymer components may singly or plurally together be used. Isophthalic acid is especially preferable among the copolymerization components from viewpoints such as processability and transparency.

The rates of the copolymerization components depend on the kinds of the copolymerization components, but are preferably such rates as giving the polymer having a melting point of 230 to 258° C. as a result. When the melting point is lower than 230° C., the heat resistance and mechanical strengths of the polymer are sometimes inferior. When the polyester contains ethylene terephthalate units as main repeating units and further isophthalic acid as a copolymerization component, the rate of the isophthalic acid is suitably not more than 12 percent by mole on the basis of the moles of the acid component. Herein, the melting point of the polyester is measured by a method comprising determining a melting peak at a temperature-rising rate of 20° C./minute by the use of DuPont Instruments 910 DSC. The amount of a sample is 20 mg.

The intrinsic viscosity (ortho-chlorophenol, 35° C.) of the polyester constituting the biaxially oriented polyester film of the present invention is preferable in a range of 0.52 to 1.50, further preferable in 0.57 to 1.00, especially preferable in 0.60 to 0.80. When the intrinsic viscosity is lower than 0.52, it is not preferable because the formability of the film is not good. On the other hand, when the intrinsic viscosity exceeds 1.50, the deterioration in the characteristics of forming and processing, the overload in the operation of an extruder, and the remarkable lowering of the intrinsic viscosity due to the excessive rise of the temperature of the resin, are often caused.

The polyester constituting the biaxially oriented polyester film of the present invention can be produced by a method which itself has been known. The method includes a method for producing the polyester by subjecting terephthalic acid, ethylene glycol, and, if necessary, a copolymerization component (for example, isophthalic acid) to an esterification reaction and then polycondensing the obtained reaction product until to give the objective polymerization degree, and a method for producing the polyester by subjecting dimethyl terephthalate, ethylene glycol, and, if necessary, a copolymerization component (for example, dimethyl isophthalate) to an ester interchange reaction and then polycondensing the obtained reaction product until to give the objective polymerization degree. Of course, if necessary, 2,6-naphthalenedicarboxylic acid may be used for the acid component, or 1,4-cyclohexanedimethanol may be used for the glycol component. If necessary, the polyester obtained by the methods (melt polymerization) may further be polymerized into the polymer having a higher polymerization degree by a polymerization method (solid phase polymerization) in a solid phase state. The polymer obtained thus can then be formed into a biaxially oriented polyester film by a method which itself has been known, namely, extruding the polyester from a linear die in a melted state to produce the non-oriented film, and then subjecting the non-oriented film to an orienting treatment and a thermal treatment.

Meanwhile, dyes generally have a defect that the dyes have weaker thermal stability and weather resistance than those of pigments. However, since a dye is added to the polyester of the present invention, most of ultraviolet light is absorbed in the polyester, and the polyester can therefore be used without worrying the weather resistance of the dye. Of course, it is a preferable mode of the present invention to add an ultraviolet light absorber to the biaxially oriented polyester film of the present invention to further control the deterioration of the dye with ultraviolet light.

As an ultraviolet light absorber to be contained in the biaxially oriented polyester film of the present invention, it is preferable that, for example, at least one compound selected from cyclic imino esters represented by the below-described Formula (1)

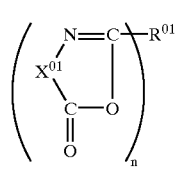

(wherein, $X^{01}$ is a divalent aromatic residue whose two bonds from $X^{01}$ represented in the above-described Formula (1) have the relation of the 1- and 2-positions; n is 1, 2 or 3; $R^{01}$ is an n-valent hydrocarbon residue, which may further contain heterogeneous atoms, or $R^{01}$ can be a direct bond, when n is 2) and the below-described Formula (2)

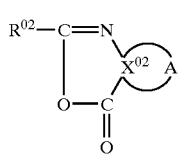

(wherein, A is a group represented by the below-described Formula (3) or the below-described Formula (4);

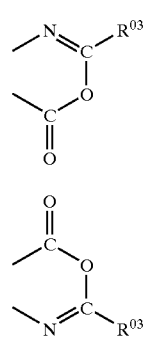

$R^{02}$ and $R^{03}$ are the same or different each other and are monovalent hydrocarbon residues, respectively; $X^{02}$ is a tetravalent aromatic residue, which may further contain heterogeneous atoms) is used in the non-reacted form. Such cyclic imino esters are compounds known as ultraviolet light absorbers, and are described in, for example, JP-A 59-12952 (1984).

In the above-described general Formula (1), $X^{01}$ is a divalent aromatic residue whose two bonds from $X^{01}$ represented in the above-described Formula (1) have the relation of the 1- and 2-positions; n is 1, 2 or 3; $R^{01}$ is an n-valent hydrocarbon residue, which may further contain one or more heterogeneous atoms, or $R^{01}$ can be a direct bond, when n is 2.

$X^{01}$ preferably includes a 1,2-phenylene, a 1,2-naphthylene, a 2,3-naphthylene, and a group represented by the below-described Formula (5)

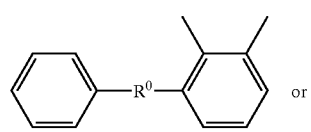

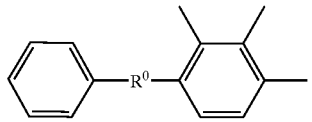

(wherein, R is —O—, —CO—, —S—, —SO$_2$—, —CH$_2$—, —(CH$_2$)$_2$—or —C(CH$_3$)$_2$—). Among the groups, a 1,2-phenylene is especially preferable.

The above-described aromatic residue exemplified in $X^{01}$ may be substituted by a substituent or substituents, for example, an alkyl having 1 to 10 carbon atoms, such as a methyl, an ethyl, a propyl, a hexyl, or a decyl; an aryl having 6 to 12 carbon atoms, such as a phenyl or a naphthyl; a cycloalkyl having 5 to 12 carbon atoms, such as a cyclopentyl or a cyclohexyl; an aralkyl having 8 to 20 carbon atoms, such as a phenylethyl; an alkoxy having 1 to 10 carbon atoms, such as a methoxy, an ethoxy, or a decyloxy; nitro; a halogen such as a chlorine or a bromine; an acyl having 2 to 10 carbon atoms, such as an acetyl, a proponyl, a benzoyl, or a decanoyl.

$R^{01}$ is an n-valent (wherein, n is 1, 2 or 3) hydrocarbon residue, or a direct bond, only when n is 2.

The monovalent hydrocarbon residue (when n is 1) includes, firstly, a non-substituted aliphatic group having 1 to 10 carbon atoms, a non-substituted aromatic group having 6 to 12 carbon atoms, and a non-substituted alicyclic group having 5 to 12 carbon atoms.

The non-substituted aliphatic group having 1 to 10 carbon atoms includes a methyl, an ethyl, a propyl, a hexyl, and a decyl. The non-substituted aromatic group having 6 to 12 carbon atoms includes a phenyl, a naphthyl, and a biphenyl. The non-substituted alicyclic group having 5 to 12 carbon atoms includes a cyclopentyl and a cyclohexyl.

The mono-valent hydrocarbon residue also includes, secondly, a group represented by the below-described Formula (6)

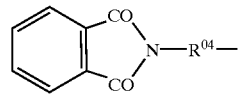

(wherein, $R^{04}$ is an alkylene having 2 to 10 carbon atoms, a phenylene or naphthylene), a group represented by the below-described Formula (7)

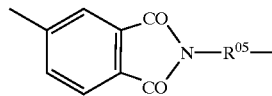

(wherein, $R^{05}$ is an alkyl group having 1 to 10 carbon atoms, a phenyl group, or a naphthyl group), a group represented by the below-described Formula (8)

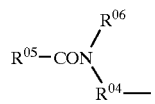

(wherein, the definitions of $R^{04}$ and $R^{05}$ are the same as described above; $R^{06}$ is a hydrogen atom or either of groups defined in $R^{05}$), and a substituted aliphatic residue or aromatic residue represented by the below-described Formula (9)

(wherein, the definitions of $R^{04}$ and $R^{06}$ are the same as described above; $R^{07}$ is a hydrogen atom or either of groups defined in $R^{05}$)

The monovalent hydrocarbon residue also includes, thirdly, the above-described aromatic residues, for example, substituted by the same substituents exemplified as the substituents of the aromatic residue represented by $X^{01}$. Therefore, the monovalent hydrocarbon residue substituted by the substituents includes a methylnaphthyl, a nitrophenyl, a nitronaphthyl, a chlorophenyl, a benzoyl phenyl, an acetyl naphthyl.

The group represented by the above-described Formula (6), (7), (8) or (9), namely the substituted aliphatic residue or aromatic residue, especially the substituted aromatic residue among the residues, are preferable as the monovalent hydrocarbon residue.

The divalent hydrocarbon residue (when n is 2) includes, firstly, a non-substituted aliphatic residue having 2 to 10 carbon atoms, a non-substituted aromatic residue having 6 to 12 carbon atoms, and a non-substituted alicyclic residue having 5 to 12 carbon atoms.

The non-substituted aliphatic residue having 2 to 10 carbon atoms includes an ethylene, a trimethylene, a tetramethylene, and a decamethylene. The non-substituted aromatic residue having 6 to 12 carbon atoms includes a phenylene, a naphthylene, and a p,p'-biphenylene. The non-substituted alicyclic residue having 5 to 12 carbon atoms includes a cyclopentylene, and a cyclohexylene.

The above-described divalent hydrocarbon residue also includes, secondly, a group represented by the below-described Formula (10)

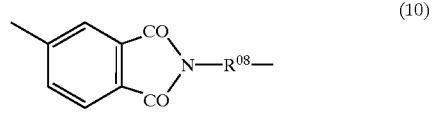

(wherein, $R^{08}$ is either of the groups defined in $R^{04}$), or a substituted aliphatic or aromatic residue represented by the below-described Formula (11)

(wherein, $R^{08}$ is the same as described above; $R^{09}$ is either of the groups defined in $R^{04}$; and $R^{010}$ is either of the groups defined in $R^{06}$).

The above-described divalent hydrocarbon residue includes, thirdly, the above-described non-substituted divalent aromatic residues substituted by the same substituents as exemplified as the substituents of the aromatic residue represented by the above-described $X^{01}$.

When n is 2, among the above-described residues, the direct bond or the non-substituted or substituted divalent aromatic hydrocarbon residue in the above-described first, second and third groups, especially the non-substituted or substituted aromatic hydrocarbon residue whose two bonds are extended from the mutually most separated positions, in the group 1 or 3, in particular, p-phenylene, p,p'-biphenylene or 2,6-naphthalene, is preferable.

The trivalent hydrocarbon residue (when n is 3) includes a trivalent aromatic residue having 6 to 12 carbon atoms.

The aromatic residue includes groups represented by the below-described Formula (12).

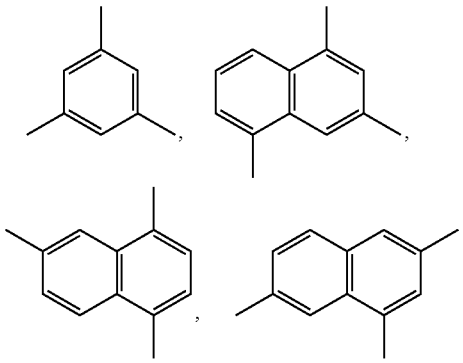
(12)

The aromatic residue may be substituted by the same substituents as exemplified as the substituents of the above-described monovalent aromatic residue.

In the above-described general Formula (5), $R^{02}$ and $R^{03}$ are the same or different each other, and are monovalent hydrocarbon residues, respectively; $X^{02}$ is a tetravalent aromatic hydrocarbon residue.

$R^{02}$ and $R^{03}$ include the same groups as the groups exemplified for $R^{01}$, when n is 1, on the explanation of the above-described Formula (1).

The tetravalent aromatic hydrocarbon residue includes groups represented by the below-described Formulae (13)

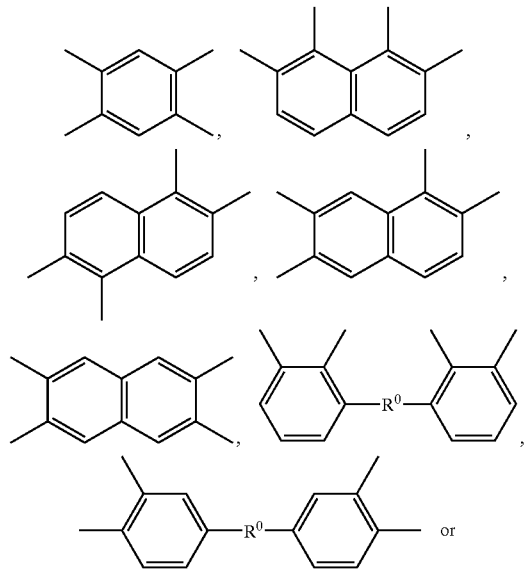
(13)

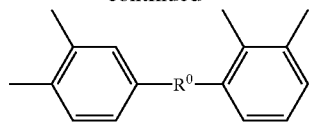
-continued (wherein, the definition of $R^0$ is the same as that in Formula (5)).

The tetravalent aromatic hydrocarbon residue may be substituted by the same substituents as exemplified as the substituents of the monovalent aromatic residue represented by $R^{01}$.

The concrete examples of the cyclic imino esters represented by the above-described formulas (1) and (2) used in the present invention include the following compounds.

Compounds, when n is 1 in the above-described Formula (1):

2-Methyl-3,1-benzoxazin-4-one, 2-butyl-3,1-benzoxazin-4-one, 2-phenyl-3,1-benzoxazin-4-one, 2-(1- or 2-naphthyl)-3,1-benzoxazin-4-one, 2-(4-biphenyl)-3,1-benzoxazin-4-one, 2-p-nitrophenyl-3,1-benzoxazin-4-one, 2-m-nitrophenyl-3,1-benzoxazin-4-one, 2-p-benzoylphenyl-3,1-benzoxazin-4-one, 2-o-methoxyphenyl-3,1-benzoxazin-4-one, 2-cyclohexyl-3,1-benzoxazin-4-one, 2-p- (or m-)-phthalimidophenyl-3,1-benzoxazin-4-one, N-phenyl-4-(3,1-benzoxazin-4-on-2-yl)phthalimide, N-benzoyl-4-(-3,1-benzoxazin-4-on-2-yl)aniline, N-benzoyl-N-methyl-4-(-3,1-benzoxazin-4-on-2-yl)aniline, 2-(p-(N-methylcarbonyl)phenyl)-3,1-benzoxazin-4-one.

Compounds, when n is 2 in the above-described Formula (1):

2,2'-Bis(3,1-benzoxazin-4-one), 2,2'-ethylenebis(3,1-benzoxazin-4-one), 2,2'-tetramethylenebis(3,1-benzoxazin-4-one), 2,2'-decamethylenebis(-3,1-benzoxazin-4-one), 2,2'-p-phenylenebis(3,1-benzoxazin-4-one), 2,2'-m-phenylenebis(3,1-benzoxazin-4-one), 2,2'-diphenylene)bis(-3,1-benzoxazin-4-one), 2,2'-(2,6- or 1,5-naphthylene)bis(3,1-benzoxazin-4-one), 2,2'-(2-methyl-p-phenylene)bis(3,1-benzoxazin-4-one), 2,2'-(2-nitro-p-phenylene)bis(3,1-benzoxazin-4-one), 2,2'-(2-chloro-p-phenylene)bis(-3,1-benzoxazin-4-one), 2,2'-(1,4-cyclohexylene)bis(-3,1-benzoxazin-4-one), N-p-(-3,1-benzoxazin-4-on-2-yl)phenyl, 4-(-3,1-benzoxazin-4-on-2-yl)phthalimide, N-p-(-3,1-benzoxazin-4-on-2-yl)benzoyl, 4-(3,1-benzoxazin-4-on-2-yl)aniline.

Compounds, when n is 3 in the above-described Formula (1):

1,3,5-Tri(3,1-benzoxazin-4-on-2-yl)benzene, 1,3,5-tri(3,1-benzoxazin-4-on-2-yl)naphthalene, 2,4,6-tri(3,1-benzoxazin-4-on-2-yl)naphthalene.

Compounds represented by the above-described Formula (2):

2,8-Dimethyl-4H,6H-benzo(1,2-d;5,4-d')bis(1,3)-oxazine-4,6-dione, 2,7-dimethyl-4H,9H-benzo(1,2-d;5,4-d')bis(1,3)-oxazine-4,9-dione, 2,8-dimethyl-4H,8H-benzo(1,2-d;5,4-d')bis(1,3)-oxazine-4,6-dione, 2,7-diphenyl-4H,9H-benzo(1,2-d;5,4-d')bis(1,3)-oxazine-4,6-dione, 6,6'bis(2-methyl-4H,3,1-benzoxazin-4-one), 6,6'bis(2-ethyl-4H,3,1-benzoxazin-4-one), 6,6'bis(2-phenyl-4H, 3,1-benzoxazin-4-one), 6,6'methylenebis(2-methyl-4H,3,1-benzoxazin-4-one), 6,6'methylenebis(2-phenyl-4H, 3,1-benzoxazin-4-one), 6,6'-ethylenebis(2-methyl-4H,3,1-benzoxazin-4-one), 6,6'ethylenebis(2-phenyl-4H, 3,1-benzoxazin-4-one), 6,6'butylenebis(2-methyl-4H, 3,1-benzoxazin-4-one), 6,6'-butylenebis(2-phenyl-4H,3,1-benzoxazin-4-one), 6,6'-oxybis(2-methyl-4H,3,1-benzoxazin-4-one), 6,6'- sulfonylbis(2-methyl-4H,3,1-benzoxazin-4-one), 6,6'-sulfonylbis(2-phenyl-4H,3,1-benzoxazin-4-one), 6,6'-carbonylbis(2-methyl-4H, 3,1-benzoxazin-4-one), 6,6'-carbonylbis(2-phenyl-4H,3,1-benzoxazin-4-one), 7,7'-methylenebis(2-methyl-4H,3,1-benzoxazin-4-one), 7,7'methylenebis(2-phenyl-4H,3,1-benzoxazin-4-one), 7,7'bis(2-methyl-4H,3,1-benzoxazin-4-one), 7,7'ethylenebis(2-methyl-4H,3,1-benzoxazin-4-one), 7,7'oxybis(2-methyl-4H,3,1-benzoxazin-4-one), 7,7'sulfonylbis(2-methyl-4H,3,1-benzoxazin-4-one), 7,7'-carbonylbis(2-methyl-4H,3,1-benzoxazin-4-one), 6,7'-bis(2-methyl-4H,3,1-benzoxazin-4-one), 6,7'-bis(2-phenyl-4H,3,1-benzoxazin-4-one), 6,7'-methylenebis(2-methyl-4H,3,1-'benzoxazin-4-one), 6,7'-methylbis(2-phenyl-4H,3,1-benzoxazin-4-one).

Among the above-exemplified compounds, preferably the compounds represented by the above-described Formula (1), more preferably the compounds in the above-described Formula (1) when n is 2, the most preferably the compound represented by the below-described Formula (14):

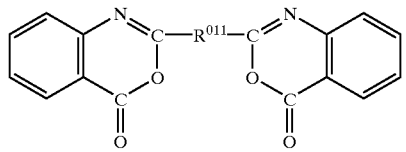

(14)

(wherein, $R^{011}$ is a divalent aromatic hydrocarbon residue) are advantageously used.

As the compound represented by Formula (14), 2,2'-p-phenylenebis(3,1-benzoxazin-4-one), 2,2'-(4,4'-diphenylene)bis(3,1-benzoxazin-4-one), and 2,2'-(2,6-naphthylene)bis(3,1-benzoxazin-4-one) are especially preferable.

Since representative compounds are described, for example, in JP-A 59-12952 (1984), the ultraviolet light absorption characteristics of the cyclic imino esters involve those of the representative compounds.

The above-described cyclic imino esters have excellent compatibility with polyesters, but further have an ability to react with the terminal hydroxyl groups of the polyesters, as described in the JP-A 59-12952 (1984) and U.S. Pat. No. 4,291,152. Therefore, it is demanded that the cyclic imino ester is carefully mixed with the polyester so that the cyclic imino ester may be contained in a substantially non-reacted state. But, when a polyester whose main rate terminal groups are carboxyl groups or a polyester whose terminal hydroxyl groups have been sealed with a terminal-sealing agent not having reactivity with said cyclic imino esters is used, a special care is not necessary for the production of a composition containing the cyclic imino ester in a non-reacted state. When a polyester whose main rate terminal groups are hydroxyl groups is used, it is desirable that a melting and mixing treatment is finished in a short time so that a melting and mixing temperature satisfies the following two expressions:

$Log t \leq -0.008T+4.8$ $Tm < T < 320$ (wherein, t is a melting and blending time (second); T is a melting and blending temperature (° C.); and Tm is the melting temperature (° C.) of the polyester). In this case, since the cyclic imino ester may be reacted with the polyester in a small rate to enlarge the molecular weight of the polyester, the lowering of the molecular weight due to the deterioration of the polyester can be prevented with a light absorber in response to the rate of the reaction. When the cyclic imino ester reacts with the polyester, a ultraviolet light absorption wavelength region generally tends to shift to a lower wavelength region side than a ultraviolet light absorption wavelength region in a non-reacted state, and it therefore tends to penetrate ultraviolet light on the higher wavelength side.

When added in a suitable amount, the above-described cyclic imino ester scarcely stains the periphery of a die, because sublimates are hardly produced. Since absorbing light ranged from ultraviolet light to light near to 380 nm, the cyclic imino ester does not color films and has excellent characteristics for preventing the deterioration of visible light absorbers and the films.

The addition amount of the above-described ultraviolet light absorber is preferably 0.1 to 5 percent by weight, further preferably 0.2 to 3 percent by weight, based on the polyester. When the amount is less than 0.1 percent by weight, the effect for preventing the ultraviolet light deterioration is little, while the film-forming characteristics of the polyester is liable to be deteriorated, when the amount exceeds 5 percent by weight. Said ultraviolet light absorber is preferably added on the polymerization or melt-extrusion of the polyester, especially preferably added in the form of master pellets.

In the present invention, the polyester constituting a biaxially oriented polyester film may, if necessary, be mixed with additives such as an antioxidant, a thermal stabilizer, a viscosity controller, a plasticizer, a hue-modifying agent, a lubricant, a nucleating agent, an antistatic, and a catalyst.

The lubricant to be added to the polyester used in the present invention includes proper surface-roughening substances (fillers). The fillers include fillers having been known as lubricity-imparting agents for polyesters, such as particles comprising calcium carbonate, calcium oxide, aluminum trioxide, kaolin, silicon dioxide, zinc oxide, carbon black, silicon carbide, tin oxide, cross-linked acrylic resins, cross-linked polystyrene resins, melamine resins, and cross-linked silicone resins. Among the substances, porous silica having an average particle diameter of 1 to 3 μm is preferable, because the porous silica can hold transparency and simultaneously impart good lubricity. The addition amount of the porous silica is preferably 0.01 to 0.005 percent by weight from the viewpoints of transparency and lubricity.

In the present invention, the thickness of the biaxially oriented polyester film is preferably not less than 50 μm, because capable of easily suppressing the scattering of glass, when a CRT is imploded. The upper limit of the thickness of the biaxially oriented polyester film is preferably not more than 250μm from the easy maintenance of a haze value at not more than 5% and from the productivity of the film.

Next, the adhesive film of the present invention, wherein an adhesive layer has been disposed on at least one side of the above-described biaxially oriented polyester film, will be described in detail.

The adhesive film of the present invention can be positioned as an intermediate product for producing a colored hard coat film for being adhered to an image display surface. The colored hard coat film for being adhered to the image display surface will be described later.

The adhesive layer constituting the adhesive film of the present invention preferably comprises a composition containing an aqueous polyester resin, an acrylic resin as a main component, or the like. Among the materials, a mixture of the aqueous polyester with the acrylic resin is especially preferable. The glass transition point (Tg) of the aqueous polyester resin forming said adhesive layer is preferably 45 to 100° C. The preferable upper limit of the Tg is 80° C., and the preferable lower limit of the Tg is 50° C. When the glass transition point (Tg) of the aqueous polyester resin is lower than 45° C., the heat resistance of the obtained adhesive film is easily lowered, and the blocking resistance is also easily lowered. On the other hand, when the glass transition point (Tg) of the aqueous polyester resin exceeds 100° C., the effect for improving the adhesivity is reduced. The aqueous polyester described herein is a water-soluble or dispersible polyester, but further includes polyesters which exhibit solubility or dispersibility in water, when a somewhat amount of an organic solvent is together used.

Such the aqueous polyester resin comprises a polybasic acid or an ester-forming derivative thereof and a polyol or an ester-forming derivative thereof. Concrete polybasic acid component, includes terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid, dimer acid, and 5-sodium sulfoisophthalic acid. Two kinds or more of the acid components are used to synthesize a copolyester resin. In addition, a small amount of an unsaturated polybasic acid component such as maleic acid or itaconic acid and a hydroxycarboxylic acid such as p-hydroxybenzoic acid may be used. Concrete polyol component includes ethylene glycol, 1,4-butanediol, diethylene glycol, dipropylene glycol, 1,6-hexanediol, 1,4-cyclohexane dimethanol, xylylene glycol, dimethylolpropane, poly(ethylene oxide) glycol, and poly(tetramethylene oxide) glycol.

The glass transition point (Tg) of the acrylic resin forming the adhesive layer is preferably in the range of −50 to 50° C. When the glass transition point (Tg) of said acrylic resin is lower than −50° C., the heat resistance of the obtained adhesive film is easily lowered, and the blocking resistance is also easily lowered. On the other hand, when the glass transition point (Tg) of the acrylic resin exceeds 50° C., the effect for improving the adhesivity is reduced. The acrylic resin described herein is a water-soluble or dispersible polyester, but further includes polyesters which exhibit solubility or dispersibility in water, when a somewhat amount of an organic solvent is together used.

Such the acrylic resin is a resin produced by copolymerizing the following acrylic monomers. Concrete preferably acrylic monomers include alkyl acrylates, alkyl methacrylates (the alkyl groups include a methyl group, an ethyl group, an n-propyl group, an isopropyl group, an n-butyl group, an isobutyl group, a t-butyl group, a 2-ethylhexyl group, and a cyclohexyl group); hydroxy-containing monomers such as a 2-hydroxyethyl acrylate, a 2-hydroxyethyl methacrylate, a 2-hydroxypropyl acrylate, and 2-hydroxypropyl methacrylate; epoxy group-containing monomers such as a glycidyl acrylate, a glycidyl methacrylate, and an allylglycidyl ether; monomers containing carboxyl groups or salts thereof, such as an acrylic acid, a methacrylic acid, an itaconic acid, a maleic acid, a fumaric acid, a crotonic acid, a styrene sulfonic acid and salts thereof (sodium salts, potassium salts, ammonium salts, tertiary amine salts, or the like); amide group-containing monomers such as an acrylamide, a methacrylamide, an N-alkylacrylamide, an N-alkylmethacylamide, an N,N-dialkylacrylamide, an N,N-dialkylmethacrylate, (the alkyl groups include a methyl group, an ethyl group, an n-propyl group, an isopropyl group, an n-butyl group, an isobutyl group, a t-butyl group, a 2-ethylhexyl group, and a cyclo hexyl group), an N-alkoxyacrylamide, an N-alkoxymethacrylamide, an N,N-dialkoxyacrylamide, an N,N-dialkoxymethacrylamide, (the alkoxy groups include a methoxy group, an ethoxy group, a butoxy group, and an isobutoxy group), an acryloylmorpholine, an N-methylolacrylamide, an N-methylolmethacrylamide, an N-phenylacrylamide, and an N-phenylmethacrylamide; acid anhydride monomers such as a maleic anhydride and itaconic anhydride; a vinyl isocyanate, an allyl isocyanate, a styrene, an α-methylstylene, a vinylmethyl ether, a vinyl ethyl ether, a vinyltrialkoxysilane, a maleic acid monoalkyl ester, a fumaric acid monoalkyl ester, an itaconic acid monoalkyl ester, an acrylonitrile, a methacrylonitrile, a vinylidene chloride, an ethylene, a propylene, a vinyl chloride, a vinyl acetate, and a butadiene.

The adhesive layer in the present invention can be formed by applying the aqueous solution, aqueous dispersion or emulsion of the above-described composition to a support material by a roll coating method, a gravure coating method, a roll brush method, a spray coating method, an air knife coating method, an impregnation method, a curtain coating method, or the like. The aqueous solution, aqueous dispersion or emulsion of the composition for forming said adhesive layer may, if necessary, be compounded with a resin except the resins exemplified in the above-described composition, such as an oxazoline group-having polymer, a cross-linking agent such as melamine, an epoxy compound or aziridine, an antistatic agent, a coloring matter, a surfactant, an ultraviolet light absorber, a lubricant (a filler or a wax), and so on. The aqueous solution, aqueous dispersion or emulsion of the above-described composition may be coated on the support during or after the production of a biaxially oriented polyester film of the support, but preferably during the production of the biaxially oriented polyester film, especially preferably at a stage until the oriented crystallization of the biaxially oriented polyester film is finished. Herein, the film at the stage until the oriented crystallization of the biaxially oriented polyester film is finished includes a non-stretched film, a monoaxially oriented film prepared by orienting the non-stretched film in the longitudinal direction (machine direction) of the film or in the direction (transverse direction) orthogonal to the longitudinal direction of the film, and further a film stretched and oriented both in the longitudinal direction of the film and in the direction orthogonal to the longitudinal direction of the film in low ratios (the biaxially oriented polyester film before finally restretched in the longitudinal direction of the film or in the direction orthogonal to the longitudinal direction of the film to finish the oriented crystallization of the film). Among the coating methods is preferable a coating method comprising coating the coating liquid of the above-described composition on a monoaxially stretched film oriented in one direction, stretching the, film as such in the direction orthogonal to the oriented direction and then applying a heat-setting treatment to the film. The adhesive layer coated thus during the stretching process is strongly adhered to the biaxially oriented polyester film of base film. Said adhesive layer or adhesive layers may, if necessary, be formed on only one side of the film or on both the sides of the film. The thickness of said adhesive layer can be adjusted by the amount of the coated coating liquid, and is in a range of preferably 70 to 100 nm, more preferably 75 to 95 nm. When the thickness of the coating film is less than 70 nm, the adhesive force is insufficient, while the blocking of the film or the enhancement of the haze value may be caused, when the thickness exceeds 100 nm and is too large.

In addition, when the coating liquid is coated on the film, it is preferable as a preliminary treatment for improving the coatability of the film to preliminarily apply a physical treatment such as a corona surface treatment, a flame treatment or a plasma treatment to the surface to be coated or to use both the coating composition and a surfactant chemically inactive to the coating composition. The surfactant accelerates the wetting of the water-based coating liquid to the polyester film, and includes anionic surfactants and nonionic surfactants, such as polyoxyethylenealkylphenyl ethers, polyoxyethylene-fatty acid esters, sorbitan fatty acid esters, glycerol fatty acid esters, fatty acid metal soaps, alkyl sulfates, alkylsulfonates, and alkylsulfossuccinates.

The coating liquid for forming the adhesive layers is often contaminated with one or more ionic low molecular compounds due to the existence of impurities or the like in a raw material. The ionic low molecular compounds described herein are substances which each has an ionic functional group represented by $-SO_3^-M+$, $-COO^-M^+$, $-PO_4^-M^+$, $-NO^-M^+$ (wherein, M is an alkali metal or an ammonium group), or the like and has a molecular weight of not more than 1,000. When said ionic low molecular compound exists in the adhesive layer in an amount exceeding 1,000 ppm, the wettability of the above-described coating liquid for the biaxially oriented polyester film is easily deteriorated on the coating of the coating liquid on the biaxially oriented polyester film, thereby not giving a coating film having a constant thickness and lowering the adhesivity. The ionic low molecular compound can be detected and measured by forming a coating film on the surface of the film and then analyzing the surface of the coating film by XPS (X-ray photon spectrum).

In the adhesive film of the present invention, it is preferable that the reflectance on the interface between the adhesive layer and the biaxially oriented polyester film is not more than 0.4% based on incident light, when the adhesive layer is placed on the back side (on an arbitrary one side, when both the sides of the film is coated) and when light in the visible light region is incident on the interface from the side of the biaxially oriented polyester film at an angle of 45 degree. Hereinafter, said reflectance is often referred to as back side reflectance. When the back side reflectance exceeds 0.4%, the effect of the back side reflectance on the surface reflection can not be ignored. Concretely, when the adhesive film is used as an optical colored coated film, the reflection of extraneous light forms a rainbow pattern by the interference of front side refection with back side reflection thereby extremely lowering the visibility. In order to lower the back side reflectance to not more than 0.4%, it is preferable to control the refractive index (nz) of the adhesive layer in the thickness direction of the adhesive layer to 1.50 to 1.60. When the nz is deviated from the above-described range, the back side reflectance in the visible light region easily exceeds 0.4%.

Next, the colored hard coat film of the present invention will be described in detail.

The colored hard coat film of the present invention is a colored hard coat film which is prepared by adding a coloring matter to a hard coat film comprising at least a hard coating layer and a transparent substrate film, and in which the transmittance of light, in a light region corresponding to a neutral color between green and red, is suitably lowered to prevent the transmission of the light in the overlapped portion between the green and the red among the above-described three primary colors.

For the colored hard coat film of the present invention, the maximum light-absorption peak in a wavelength region of 540 to 630 nm is in a wavelength region of 560 to 610 nm, in order to prevent the transmission of the light of the overlapped portion between the green and the red among the above-described three primary colors. When the wavelength of said maximum absorption peak is less than 560 nm or exceeds 610 nm, most of emitted green or red light itself is absorbed, whereby the improvement of contrast or color purity is not expected. The wavelength of said maximum absorption peak is preferably in a wavelength region of 570 nm to 600 nm.

For the colored hard coat film of the present invention, the half band width of the maximum light absorption peak in the visible light wavelength region of 540 to 630 nm is not more than 80 nm, in order to prevent the transmission of the light of the overlapped portion between the green and the red among the above-described three primary colors. When the half band width of the maximum absorption peak exceeds 80 nm, most of emitted green or red light is absorbed, whereby the improvement of contrast or color purity is not expected. The half band width of the maximum absorption peak is preferably not more than 60 nm, further preferably not more than 50 nm, extremely preferably not more than 40 nm. The lower limit of the half band width of the maximum absorption peak is preferably at least 10 nm, because of being capable of corresponding to wide display devices.

For the colored hard coat film of the present invention, the transmittance ($T_x$) of light having a wavelength (X) at the maximum light-absorption peak must be less than 0.80 based on a transmittance ($T_{540}$) for light having a wavelength of 540 nm, in order to improve the contrast and the color purity. Hereinafter, $T_x$ and $T_{540}$ are often referred to as a transmittance for the light having the wavelength (X) and a transmittance for the light having the wavelength of 540 nm, respectively. When $T_x$ is not less than 0.8 based on $T_{540}$, the absorption of the neutral color between the red and the green is insufficient, whereby the improvement of contrast and color purities can not be expected. $T_x/T_{540}$ is preferably less than 0.60, more preferably less than 0.40. The more preferable the lower limit of $T_x/T_{540}$ is, the lower the lower limit of $T_x/T_{540}$ is. The lower limit of the $T_x/T_{540}$ is therefore not limited. But, the lower limit of the $T_x/T_{540}$ is preferably not less than 0.05, more preferably not less than 0.10, because the, excessive addition of the coloring matter is not needed.

The colored hard coat film of the present invention contains the coloring matter to selectively absorb visible light, thereby being liable to cause the deviation of color development. It is therefore important to inhibit the deviation of the hue (chroma) as much as possible not to change originally reflected colors. In order to inhibit the deviation of the hue, it is desirable that the transmittances ($T_{450}$, $T_{540}$ and $T_{620}$) of lights at the wavelengths 450 nm, 540 nm and 620 nm of red, green and blue lights, respectively, are the approximately same each other. The colored hard coat film of the present invention has $T_{450}/T_{540}$ and $T_{620}/T_{540}$ in ranges of 0.5 to 1.5, respectively. When $T_{450}/T_{540}$ and $T_{620}/T_{540}$ are less than 0.5 or exceed 1.5, respectively, the chromaticity of light emitted from a cathode-ray tube is enlarged to lower the visibility. The upper limit and lower limit of $T_{450}/T_{540}$ and $T_{620}/T_{540}$ are preferably 1,3 and 0.7, respectively, more preferably 1.2 and 0.8, respectively.

Meanwhile, the colored hard coat film of the present invention contains the coloring matter satisfying the above-described optical characteristics in either layer constituting said hard coat film. It is preferable that the coloring matter used in the present invention is hardly changed or deteriorated at temperature of at least 150° C. or lower under the consideration of the heat history until the final product. Especially, the anthraquinone-based coloring matters, quinacridone-based coloring matters, perinone-based coloring matters, polymethine-based coloring matters, pyrromethene-based coloring matters, porphyrin-based coloring matters and phthalocyanine-based coloring matters exemplified in the biaxially oriented polyester film of the present invention are preferable. The preferable amount of the coloring matter to be added is in a range of preferably 0.004 to 0.420 g/m$^2$, further preferably 0.004 to 0.200 g/m$^2$, based on the area of the colored hard coat film, namely the area of the side vertical to the thickness direction of the colored hard coat film.

The haze value of the colored hard coat film of the present invention is preferably not more than 10%, more preferably not more than 5%. When the haze value is larger than 10%, the hue of an image becomes cloudy, thereby being liable to lack the clarity of the image to lower the visibility. As the coloring matter used in the present invention, either of a dye and a pigment may be used, but the dye is preferable from the viewpoint of the haze value. When the pigment is used as the coloring matter, it is preferable that the particle diameter of the pigment is reduced to control the haze value. The especially preferable average particle diameter of the pigment is in a range of 50 to 500 nm.

The layer configuration of the colored hard coat film of the present invention will be described in detail by the use of FIG. 4 to FIG. 10 hereinafter. Marks in Figures designate as follows. 1: a transparent substrate film, 2: a colored layer, 3: a sticky layer, 4: a hard coat layer, 5: an antireflection layer, 6: a stain-proofing layer, 21: a colored transparent substrate film, 23: a colored sticky layer, 24: a colored hard coat layer, 51: a middle refractive index layer, 52: a high refractive index layer, and 53: a low refractive index. The adhesive layer explained in the above-described adhesive film enhances the adhesivity of the transparent substrate film to the hard coat layer or the sticky layer. The sticky layer described herein is used for sticking the colored hard coat film to an image display surface. Hereinafter, the adhesive layer and the sticky layer are often referred to as the first adhesive layer and the second adhesive layer, respectively.

Figure 4:
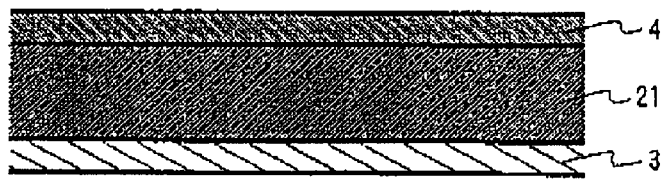
FIG. 4 shows a layer structure that is the cross section of the colored hard coat film of the present invention in the thickness direction.

FIG. 4 shows a layer configuration 1 of the colored hard coat film of the present invention. The colored hard coat film of FIG. 4 is an example using a colored transparent substrate film 21 containing a coloring matter. A hard coat layer 4 is formed on one side of said colored transparent substrate film 21, and a sticky layer 3 is formed on the other side, namely a side which is stuck to the display surface of a display device.

Figure 5:
FIG. 5 to FIG. 10 show the other layer structures of the colored hard coat films of the present invention, which are the cross sections of the other colored hard coat films of the present invention in the thickness direction.

FIG. 5 shows a layer configuration 2 of the colored hard coat film of the present invention. The colored hard coat film of FIG. 5 is an example using a sticky layer containing a coloring matter. A hard coat layer 4 is formed on one side of a transparent substrate film 1, and a colored sticky layer 23 is formed on the other side, namely a side that is stuck to the display surface of a display device.

Figure 6:
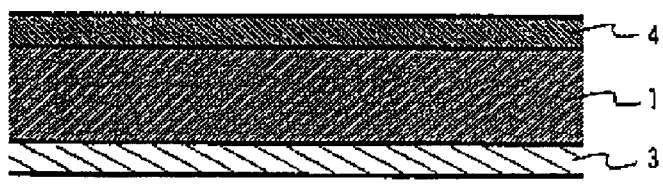

FIG. 6 shows a layer configuration 3 of the colored hard coat film of the present invention. The colored hard coat film of FIG. 6 is an example using a hard coat layer containing a coloring matter. A hard coat layer 24 is formed on one side of a transparent substrate film 1, and a sticky layer 3 is formed on the other side, namely a side that is stuck to the display surface of a display device.

Figure 7:
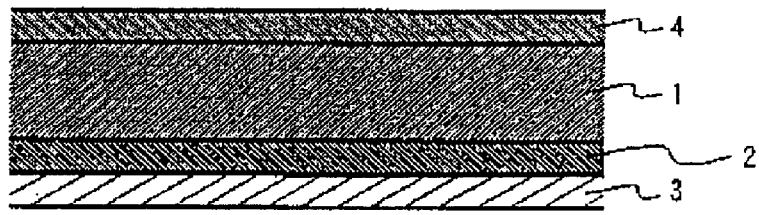

FIG. 7 shows a layer configuration 4 of the colored hard coat film of the present invention. As shown in FIG. 7, a hard coat layer 4 is formed on one side of a transparent substrate film 1, and a colored layer 2 containing a coloring matter is formed on the other side. A sticky layer 3 is further formed on said colored layer 2. Herein, the side to which the sticky layer 3 of the colored hard coat film is formed is a side that is stuck to the display surface of a display device.

Figure 8:
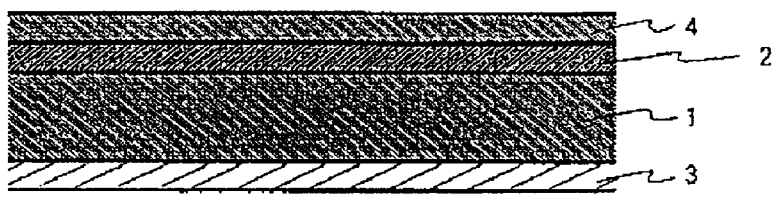

FIG. 8 shows a layer configuration 5 of the colored hard coat film of the present invention. In the colored hard coat film of FIG. 8, a colored layer 2 containing a coloring matter is formed on one side of a transparent substrate film 1, and a hard coat layer 4 is further formed on said colored layer 2. A sticky layer 3 is formed on the other side of the transparent substrate film 1, namely a side that is stuck to the display surface of a display device.

Figure 9:
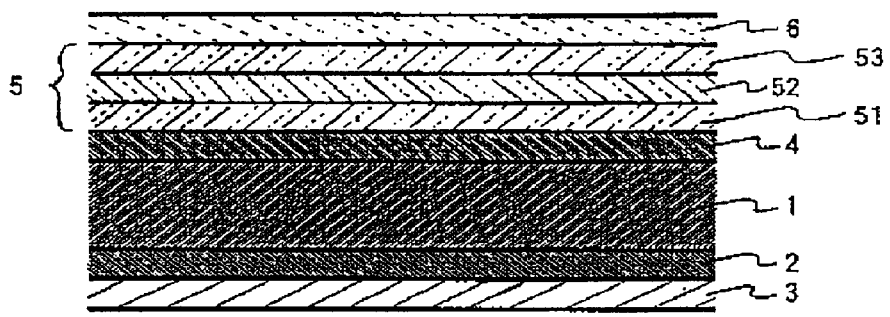

FIG. 9 shows a layer configuration 6 of the colored hard coat film of the present invention. The colored hard coat film of FIG. 9 is an example to which an antireflection property and a stain-proofing property have been added and which has been obtained by disposing an antireflection layer 5 comprising a middle refractive index layer 51, a high refractive index layer 52, and a low refractive index layer 53 in this order on the hard coat layer 4 of the colored hard coat film having the layer configuration 4 of FIG. 7 and further disposing a stain-proofing layer 6 on said antireflection layer 5. The antireflection layer 5 or the stain-proofing layer 6 may be is applied not only to the colored hard coat film having the layer configuration 1 but also to the colored hard coat film having either of the above-described layer configurations 2 to 5, and the antireflection layer 5 and the stain-proofing layer 6 are preferably disposed on the side different from the transparent substrate film side of the hard coat layer.

Figure 10:
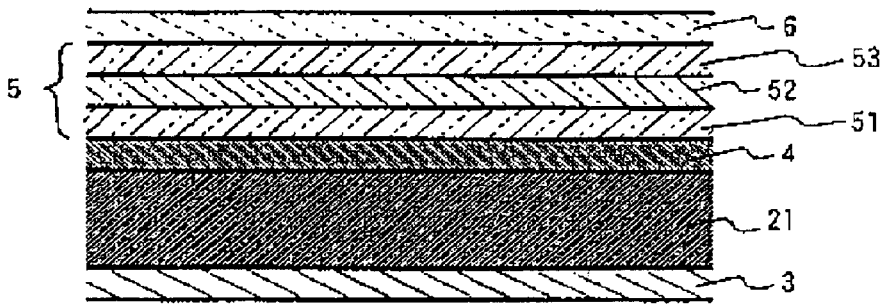

FIG. 10 shows a layer configuration 7 of the colored hard coat film of the present invention. The colored hard coat film of FIG. 10 is an example to which an antireflection property and a stain-proofing property have been added and which has been obtained by disposing an antireflection layer 5 comprising a middle refractive index layer 51, a high refractive index layer 52, and a low refractive index layer 53 in this order on the hard coat layer 4 of the colored hard coat film having the layer configuration 1 of FIG. 4 and further disposing a stain-proofing layer 6 on said antireflection layer 5.

In addition, the colored hard coat film of the present invention is not limited to the layer configurations of the above-described FIG. 4 to FIG. 10, but may be the combinations of the layer configurations. The combinations of the layer configurations include a configuration in which a coloring matter is contained in both a transparent substrate film and a hard coat layer, in both a transparent substrate film and a sticky layer or the sticky layer and a hard coat layer, or in the three layers of a transparent substrate film, a hard coat layer and a transparent substrate film.

The transparent substrate film for forming the colored hard coat film of the present invention is especially not limited, when being colorless and transparent and having practically endurable mechanical strengths as the support of the colored hard coat film. The "colorless" described herein means to satisfy the optical characteristics for the above-described visible light, when the transparent substrate film is processed into the colored hard coat film. Transparent substrate films colored by the addition of a coloring matter are also included, when the transparent substrate films satisfy said optical characteristics. Additionally, the "transparent" described herein means that the haze is at most not more than 10%, preferably not more than 5%.

The concrete transparent substrate film used in the present invention includes polyester films, triacetylcellulose (TAC) films, polyarylate films, polyimide films, polyether films, polycarbonate films, polysulfone films, polyethersulfone films, polyamide films, polypropylene films, polymethylpentene films, polyvinyl chloride films, polyvinyl acetal films, polymethyl mechacrylate films, and polyurethane films. Among the films, the polyester films are preferable from the viewpoints of transparency and processability, and, in particular, biaxially oriented polyester films are preferable, because mechanical strengths are high. The thicknesses of the transparent substrate films are preferably not less than 50 $\mu$m, because of being easily capable of controlling the scatter of glass, when a CRT is imploded. On the other hand, the upper limits of the thickness is preferably not more than 250 $\mu$m, because the haze values of the films can easily be controlled to not more than 10% and because the productivity of the films is high. To the biaxially oriented polyester film constituting the colored hard coat film of the present invention, the above-described explanations for the biaxially oriented polyester film of the present invention can similarly be applied, except that the addition of a coloring matter is not needed.

Meanwhile, it is preferable that an adhesive layer is disposed on at least one side of the biaxially oriented polyester film constituting the colored hard coat film of the present invention, in order to enhance adhesivity to the hard coat layer, or the like. To the adhesive layer disposed on at least one side of the biaxially oriented polyester film constituting the colored hard coat film of the present invention, the explanations for the above-described adhesive film can similarly be applied. The adhesive layer is especially preferably an adhesive layer comprising a composition consisting mainly of an aqueous polyester and a fatty acid amide and/or a fatty acid bisamide.

The fatty acid amide or fatty acid bisamide constituting the adhesive layer in the present invention is represented by $R^{001}CONH_2$ or $R^{001}CONHR^{003}NHOCR^{002}$, wherein $R^{001}CO-$ and $R^{002}CO-$ are fatty acid residues, respectively, and $-NHR^{003}NH-$ is a diamine residue. The fatty acid in the present invention is preferably a saturated or unsaturated fatty acid having 6 to 22 carbon atoms, and the diamine is preferably a diamine having 1 to 15 carbon atoms, especially preferably an alkylenediamine. The bisamide is preferably an N,N'-alkylenebisamide having 13 to 15 carbon atoms and a molecular weight of 200 to 800. Concrete examples include N,N'-methylenebisstearic acid amide, N,N'-ethylenebispalmitic acid amide, N,N'-methylenebislauric acid amide, linoleic acid amide, caprylic acid amide and stearic acid amide.

The fatty acid amide and/or the fatty acid bisamide are preferably contained in an amount of 3 to 10 percent by weight in a composition for forming a coating film. When the content of the fatty acid amide and/or the fatty acid bisamide is less than 3 percent by weight, it is difficult to obtain a sufficient adhesive force, thereby tending to deteriorate lubricity and blocking resistance. On the other hand, when the content exceeds 10 percent by weight, the deterioration of the stickiness of the film to the coating film, the decrease of the adhesivity of the coating film to an adhesive for glass, the brittleness of the coating film and the increase of haze are liable to be caused.

The adhesive layer in the present invention has a frictional coefficient of preferably not more than 0.8, more preferably not more than 0.6%. When the frictional coefficient of the adhesive layer exceeds 0.8, the take-up property and processability of the film is deteriorated to make it impossible to smoothly produce and process the film. As a means for forming the adhesive layer having such the frictional coefficient can be cited the addition of a surface-roughening agent, having an average particle diameter of not more than 0.15 $\mu$m, especially 0.01 to 0.1 $\mu$m, to the coating film of the adhesive layer. The concrete examples of the surface-roughening agent include the inorganic fine particles of calcium carbonate, magnesium carbonate, calcium oxide, zinc oxide, magnesium oxide, silicon dioxide, sodium silicate, aluminum hydroxide, iron oxide, zirconium oxide, barium sulfate, titanium dioxide, tin oxide, antimony trioxide, carbon black, molybdenum disulfide, and so on, and the organic fine particles of acrylic cross-linked polymers, styrenic cross-linked polymers, cross-linked silicone resins, fluorine-contained resins, benzoguanamine resins, phenolic resins, nylon resins, polyethylene wax, and so on. In order to avoid that the water-insoluble solid substances among these substances are precipitated in water dispersions, it is preferable to select ultra fine particles having a specific gravity of not more than 3.

These surface-roughening substances have a roughening action for the surface of the coating film and a reinforcing action for the coating film by the fine particles themselves, and further exhibits an action for imparting blocking resistance to the coating film and an action for giving slipperiness to the laminate. The surface-roughening substance is preferably added to a coating film-forming composition in an amount of 5 to 30 percent by weight. The amount is preferably selected from a range of 5 to 10 percent by weight, when relatively large particles having an average particle diameter of not less than 0.1 $\mu$m are used. The amount is also preferably selected from a range of 8 to 30 percent by weight, when particles having an average particle diameter of 0.01 to 0.1 $\mu$m are used. When the content of the surface-roughening agent in the coating film is too large, the haze value of the obtained laminate exceeds 3%, further 5% in a bad case, to deteriorate the transparency of the laminate. Thereby, a care is needed. In addition, it is preferable that the center-line average height (Ra) of the adhesive layer containing the surface-roughening substance is 2 to 10 nm. When Ra is less than 2 nm, it is difficult to achieve the frictional coefficient, thereby deteriorating a laminate package shape due to the shortage of slipperiness, when the laminate is taken up, and further interfering subsequent works. On the other hand, when the Ra of the adhesive layer exceeds 10 nm, the transparency is liable to be deteriorated to give a larger haze than 5%.

The adhesive layer in the present invention may preferably be formed by coating an aqueous solution, aqueous dispersion or emulsion of a composition comprising the above-described aqueous polyester and the above-described fatty acid amide and/or the above-described fatty acid bisamide by a roll coat method, a gravure coat method, a roll brush method, a spray coat method, an air knife coat method, an impregnation method, a curtain coat method, or the like. Additionally, if necessary, a resin except the above-described aqueous polyesters, a surface-roughening substance, an antistatic agent, a surfactant, an ultraviolet light absorber, and so on may be added to form a coating film. The coating of the coating liquid on a biaxially oriented polyester film may be carried out at an arbitrary stage, preferably at a stage for producing the biaxially oriented polyester film, especially preferably at a stage until the finish of the oriented crystallization of the biaxially oriented polyester film. Herein, the stage until the finish of the oriented crystallization includes the stage of a non-stretched film, the stage of a monoaxially oriented film obtained by orienting the non-stretched film in either one of the longitudinal direction and the lateral direction, and the stage of a biaxially oriented film (a biaxially oriented stretched film before finally restretched in both the longitudinal direction and the lateral direction to finish the oriented crystallization)

obtained by orienting in both the longitudinal direction and the lateral direction in low stretching ratios. Among the stages is preferable a stage for coating the coating liquid of the above-described composition on the monoaxially stretched film oriented in one direction and then applying a lateral stretching treatment and a heat-setting treatment to the coated film as such. The adhesive layer obtained thus expresses a strong adhesive force to the biaxially oriented polyester film of base film. If necessary, the coating film may be formed only on one side of the film, or the coating films may be formed on both the sides of the film. The coating liquid is preferably coated in such an amount that the thickness of the coating film becomes in a range of 70 to 100 nm, preferably 75 to 95 nm. When the thickness of the coating film is less than 70 nm, the adhesive force of the coating film is insufficient, while, when the thickness is excessively larger than 100 nm, the blocking of the film and the increase of haze value may be caused.

In addition, when the coating liquid is coated on the film, it is preferable to preliminarily apply a physical treatment such as a corona surface treatment, a flame treatment, or a plasma treatment as a preliminary treatment for improving coatability to a surface to be coated, or to use the coating composition together with a surfactant chemically inactive with the coating composition. The surfactant is a substance for accelerating the wetting of a water-based coating on the polyester film, and includes anionic surfactants and nonionic surfactants such as polyoxyethylenealkylphenyl ethers, polyoxyethylene-fatty acid esters, sorbitan fatty acid esters, glycerol fatty acid esters, fatty acid metal salts, alkyl sulfates, alkylsulfonates, and alkylsulfosuccinates.

The biaxially oriented polyester film having the adhesive layer in the present invention is preferable to have a reflectance (hereinafter often referred to as a back side reflectance) of not more than 0.4% on the interface between the adhesive layer and the biaxially oriented polyester film, when the adhesive layer is placed on the back side (an arbitrary one side, when both the sides are coated) and when light in the visible light region is incident from the side of the biaxially oriented polyester film at an angle of 45 degree to the side. When the back side reflectance exceeds 0.4%, an effect thereof on the front side reflection can not be ignored. When the laminate is used for a glare-proof film of a display as an optical laminate, the reflection of extraneous light forms rainbow patterns by the interference of the front side reflection with the back side reflection. The rainbow patterns offend eyes and are liable to deteriorate visibility. In order to reduce the back side reflectance to not more than 0.4%, it is preferable to control the reflectance (nz) of the coating film in the thickness direction to 1.50 to 1.60. When the nz is deviated from the above-described range, the back side reflectance of light in the visible light region is liable to exceed 0.4%. Additionally, when said reflectance exceeds the range, the effect of the back side reflection is actualized, and often causes troubles that the prevention of reflection becomes difficult, when the below-described antireflection layer is disposed. The thus-obtained transparent substrate film having the adhesive layer has excellent surface slipperiness, excellent adhesivity and simultaneously excellent transparency.

When the above-described coloring matter is added to a transparent substrate film, such as a biaxially oriented polyester film, in the present invention, the coloring matter may be added by dispersing or dissolving the coloring matter in ethylene glycol or the like and then adding the dispersion or solution to the polyester at its polymerization stage, or may be added by preparing polyester resin pellets containing the coloring matter in a higher concentration than that of the coloring matter contained in the film or preparing the melted and solidified pellets of the coloring matter itself and then adding the pellets to the polyester. The latter method is, preferable from the viewpoints of film productivity, foreign matter contamination prevention and process simplification. When the coloring matter is melted and solidified, a binder may properly be added. When the melted and solidified pellets of the coloring matter itself are especially added and mixed, the addition of the pellets by the use of a small feeder is preferable as a method for adding and mixing the coloring matter, because the mechanical properties of the melted and solidified pellets of the coloring matter itself are different from those of the polyester pellets. A property scarcely lowering the viscosity of the polyester resin on the extrusion of the polyester is preferable as the property of the coloring matter to be added to the polyester from the viewpoint of productivity. Since the light resistance of the coloring matter can be enhanced and since the coloring matter can homogeneously be dispersed, the transparent substrate film containing the coloring matter is most preferable for the colored hard coat film of the present invention.

In the colored hard coat film of the present invention, the coloring matter may be added to one or more layers of the transparent substrate film, the hard coat layer and the adhesive layer, but a new-colored layer may be disposed.

An ionizing radiation-curable resin, a thermosetting resin or a thermoplastic resin can be used as a resin for forming said colored layer. The coloring matter is preferably prepared so that the total transmittance of the colored hard coat film is not less than 40%, and then added to the resin to produce a resin composition for the colored layer. The method for coating said resin composition for the colored layer may properly be selected from a roll coating method, a gravure coating method, a bar coating method, an extrusion coating method, and so on in response to the characteristics of the coating material and amount of the coating to be coated. When the resin composition for the colored layer is also coated on the transparent substrate film, a coating method which itself has been known may, of course, similarly be adopted, and the resin composition may be coated at an arbitrary time stage. Concretely, the resin composition may be coated at a stage for producing the transparent substrate film or after the production of the film. When the resin composition is coated, a proper solvent capable of dissolving the above-described resin composition may be used, or the aqueous solution, aqueous dispersion or emulsion of the above-described resin composition may be used. When the resin composition is coated at a stage for producing the transparent substrate film, it is desirable to coat the aqueous solution, aqueous dispersion or emulsion of the above-described resin composition. In addition, said colored layer may be formed as the above-described adhesive layer by coating the aqueous solution, aqueous dispersion or emulsion of the above-described resin composition at the stage for producing the transparent substrate film.

The hard coat layer constituting the colored hard coat film of the present invention comprises an ionizing radiation-curable resin, a thermosetting resin, a thermoplastic resin, or the like. The hard coat layer preferably comprises the ionizing radiation-curable resin, because a film-forming work can easily be performed for the transparent substrate film and further because pencil hardness can readily be enhanced to a desired value.

The ionizing radiation-curable resin used for forming the hard coat layer is preferably the resin having acrylate-based functional groups especially preferably a polyester acrylate or a urethane acrylate. The above-described polyester acrylate comprises the acrylate and/or methacrylate of a polyester-based polyol oligomer. Hereinafter, the acrylate and the methacrylate are often referred to as (meth)acrylate. The above-described urethane acrylate comprises the acrylate of an oligomer comprising a polyol compound and a diisocyanate compound. The monomer constituting the acrylate includes methyl (meth)acrylate, ethyl (meth)acrylate, butyl (meth)acrylate, 2-ethylhexyl (meth)acrylate, methoxyethyl (meth)acrylate, butoxyethyl (meth)acrylate, and phenyl (meth)acrylate.

Meanwhile, a multifunctional monomer may together be used, when it is desired to further enhance the hardness of the hard coat layer.

Concrete multifunctional monomer includes trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth) acrylate, and neopentyl glycol di(meth)acrylate.

The polyester-based oligomer used for forming the hard coat layer includes a polyadipatetriol and a polysebacatepolyol which are the condensation product of adipic acid, a glycol (ethylene glycol, polyethylene glycol, propylene glycol, butylene glycol, polybutylene glycol, or the like) and a triol (glycerol, trimethylolpropane, or the like), and a condensation product of sebacic acid, the glycol and the triol), respectively. The above-described aliphatic dicarboxylic acid may partially or wholly be replaced with one or more other organic acids. Herein, isophthalic acid, terephthalic acid or phthalic anhydride is preferable as the other organic acid, because high hardness can be expressed in the hard coat layer.

The polyurethane-based oligomer used for forming the hard coat layer can be obtained from the condensation product of a polyisocyanate with a polyol. The polyisocyanate concretely includes methylene•bis(p-phenylene diisocyanate), hexamethylene diisocyanate • hexanetriol adduct, hexamethylene diisocyanate, tolylene diisocyanate, tolylene diisocyanate•trimethylolpropane adduct, 1,5-naphtylene diisocyanate, thiopropyl diisocyanate, ethylbenzene-2,4-diisocyanate, 2,4-tolylene diisocyanate dimer, hydrogenated xylylene diisocyanate, and tris(4-phenyl isocyanate) thiophosphate. The polyol also concretely includes polyether-based polyols such as polyoxytetramethylene glycol, polyester-based polyols such as polyadipate polyol and polycarbonate polyol, and the copolymers of acrylates with hydroxyethyl methacrylate.

Further, when an ultraviolet light-curable resin is used as the ionizing radiation-curable resin for forming the hard coat layer, the ultraviolet light-curable resin is preferably mixed with an acetophenone compound, a benzophenone compound, Michler's benzoyl benzoate, an α-amyloxime ester, a thioxanthone compound or the like as a photopolymerization initiator and n-butylamine, triethylamine, tri-n-butylphosphine or the like as a photosensitizer.

Additionally, the urethane acrylate has rich elasticity, good flexibility and excellent processability (bendability), but is difficult to obtain a sufficient surface hardness and a pencil hardness of not less than 2H. On the other hand, the polyester acrylate can form a hard coat layer having an extremely high hardness by selecting the components of the polyester. Thereby, a hard coat layer comprising 60 to 90 parts by weight of the urethane acrylate and 40 to 10 parts by weight of the polyester acrylate is preferable, because both a high hardness and a good flexibility can easily be obtained.

Meanwhile, it is preferable to add inactive fine particles having a secondary particle diameter of not more than 20 $\mu$m in an amount of 0.3 to 3 parts by weight per 100 parts by weight of the resin component to a coating liquid used for forming the hard coat layer, in order to adjust the gloss and to impart a surface slip property (not a mold release property). When the amount is not more than 0.3 part by weight, the effect for improving the slip property is poor, while the pencil hardness of the obtained hard coat layer is often lowered, when the amount is above 3 parts by weight. The inactive fine particles to be added to the coating liquid include the fine particles of inorganic substances such as silica, magnesium carbonate, aluminum hydroxide and barium sulfate, and the fine particles of organic polymers such as polycarbonates, acrylic resins, polyimides, polyamides, polyethylene terephthalate and melamine resins.

A coating method for forming the hard coat layer is preferably suitably selected from methods which themselves have been known, such as a roll coating method, a gravure coating method, a bar coating method, and an extrusion coating method, in response to the characteristics and amount of the coating liquid to be coated.

The sticky layer constituting the colored hard coat film of the present invention is properly selected from adhesives and sticking agents which themselves have been known, and is especially not limited. Herein, the sticky layer is used for sticking the colored hard coat film to an image display surface, and is different from the adhesive layer for improving the adhesivity of the biaxially oriented polyester film. Since the sticky layer used in the present invention has proper adhesivity and excellent removability scarcely causing the left of a paste on peeling, a sticking agent comprising a mixture of a wax with a sticky resin having a low glass transition temperature or a thermoplastic elastomer having rubber elasticity is preferably used.

The sticky resin having a low glass transition temperature includes acrylic resins and silicone-based resins, and the thermoplastic elastomer having rubber elasticity includes natural rubber and synthetic rubbers such as ethylene-vinyl acetate copolymer, butadiene rubber, styrene-butadiene rubber, nitrile rubbers, nitrile-butadiene rubbers, high styrene rubber, and acrylic rubbers.

Additionally, the sticky layer may, if necessary, be covered with a mold release film (separate film). For the mold release film, ordinary paper materials, silicone release paper, plastic films and silicone release films can be used especially without being limited.

The layers forming the colored hard coat film of the present invention may be cured for each layer, but may be simultaneously cured, when the curing is needed. When one or more ultraviolet light-curable resin compositions are especially used for two or more layers, the following curing method is preferably adopted, because the coating film can effectively be cured.

When the coating films of ultraviolet light-curing resin compositions except the outermost surface layer are first cured in half-cured states, and then irradiated with ultraviolet light to simultaneously cure the coating layers, photo-curing initiators responding to the wavelength characteristics of an ultraviolet light source used for the ultraviolet light are selected and used. The photo-curing initiators having different peaks in the absorption wavelength region for the plural coating film layers of the ultraviolet light-curable resin compositions are added. Thus, the curing treatments of the coating film layers containing the photo-curing initiators having the different peaks in the wavelength region can easily and effectively be adjusted. In other words, selective wavelengths capable of easily reaching the layers, respectively, can effectively be used in the irradiation spectrum wavelength region of the ultraviolet light source, thereby enabling to form the cured coating films wherein the adhesion properties among the substrate and the plural coating film layers have been improved.

The anti-reflection layer used in the present invention is especially not limited, unless deteriorating the above-described optical characteristics of the colored hard coat film. The concrete examples of the anti-reflection layer include (1) an anti-reflection layer comprising an about 0.1 μm-thick ultra thin film of $MgF_2$ or the like, (2) an anti-reflection layer formed from a vacuum-deposited metal film, (3) an anti-reflection layer prepared by disposing a layer comprising a material having a lower light refractive index than the light refractive index of the hard coat layer on the hard coat layer, (4) an anti-reflection layer prepared by disposing a high refractive index layer having a high refractive index on a hard coat layer and then disposing a low refractive index layer having a lower refractive index than the refractive index of the high refractive index layer on the high refractive index layer (for example, an anti-reflection layer; in whose site contacted with a hard coat layer, the ultra fine particle layer of a metal oxide having a high refractive index is omnipresent), (5) a multi-layered laminate type anti-reflection layer prepared by repeatedly laminating the layer structures of the above-described (4), and (6) an anti-reflection layer prepared by disposing a middle refractive index layer having a lower refractive index than the refractive index of Ha high refractive index layer having a high refractive index on the inside (a display surface side when adhered to a display surface) of said high refractive index layer, and then disposing a low refractive index layer having a lower refractive index than the refractive index of the middle refractive index layer on the outside (a side different from the display surface side when adhered to the display surface) of said high refractive index layer having the high refractive index.

Among the antireflection layers, an antireflection layer formed by laminating a middle refractive index layer 51, a high refractive index layer 52 and a low refractive index layer 53 in this order to a transparent substrate film 1 through a hard coat layer 4 as shown in the colored hard coat films of FIG. 9 and FIG. 10 is preferable, because the reflection can more effectively be prevented. In addition, the colored hard coat film of FIG. 10 is especially preferable, because the coloring matter can more homogeneously be dispersed to control the irregularity of the hue. Further is preferable an antireflection layer whose low refractive index layer 53, middle refractive index layer 51, and high refractive index layer 52 comprise $SiO_x$, respectively, whose low refractive index layer 53 and high refractive index layer 52 have refractive indexes of more than 1.4 and less than 2.2, respectively, whose low refractive index layer 53, high refractive index layer 52 and middle refractive index layer 51 have thickness of 80 to 110 nm, 30 to 110 nm, and 50 to 100 nm, respectively, and whose layers have optical film thickness D (D=n·d, wherein n is the refractive index of the middle refractive index layer; d is the thickness of the middle refractive index layer) of not more than the wavelengths of visible light.

The stain-proofing layer used in the present invention is produced from a fluorine-contained resin or a silicone-based resin, which are used for water-repelling coatings. When the low refractive index layer of the antireflection layer is formed from $SiO_2$, for example, a fluorosilicate-based water-repelling coating is preferable.

EXAMPLES

The present invention will be explained in detail hereafter with Examples. Characteristic values in the Examples were measured or evaluated by the following methods. Parts and ratios in the Examples designate parts by weight and weight ratios, unless especially explained.
(1) Total Light Transmittance and Haze Value Total light transmittances Tt (%) and scattered light transmittances Td (%) were measured using a haze meter (NDH-20) manufactured by Nippon Denshoku Industry Co. according to JIS K6714-1958.

The obtained total light transmittances were evaluated according to the following standards. The evaluations of 2 and larger did not have a problem in practical applications. The evaluation of 3 was extremely excellent.

◯:Total light transmittance was not less than 60%.

Δ: Total light transmittance was not less than 40% and less than 60%.

X: Total light transmittance was less than 40%.

And, hazes (%) were calculated from the measured total light transmittances Tt (%) and the measured scattered light transmittance Td (%) by the use of the following equation.

$$Haze\ (\%)=(Td/Tt)\times 100$$

The obtained haze values of biaxially oriented polyester films were evaluated according to the following standards.

◎: haze value ≦2.0% (the haze value was small, and the film could extremely well be used in practical applications).

◯: 2.0%<haze value≦3.0% (the haze value was small, and the film could well be used in practical applications).

Δ: 3.0%<haze value≦5.0% (the haze value was somewhat small, and the film did not have a problem in practical applications).

X: 5.0%<haze value (the haze value was large, and the film had problems).

The obtained haze values of the colored hard coat films were evaluated according to the following standards.

◎◎: haze value≦2.0% (the film is scarcely hazy, and is highly good).

◎: 2.0%<haze value≦3.0% (the haze value is small, and the film is good in practical application).

◯: 3.0%<haze value≦5.0% (the haze value has no problem in practical applications).

Δ: 5.0%<haze value≦10% (the haze value often somewhat has a problem in practical applications).

X: 10%<haze value the haze value is large, and the film can practically not be used).
(2) Light Transmittance Characteristics in Visible Light Between Wavelengths of 400 to 650 nm The transmittances of the visible light in wavelengths of 400 to 650 nm were measured using a spectrophotometer, MPC 3100, manufactured by Shimadzu Seisakusho Co. Ltd., and the transmittance at each wavelength, the maximum absorption wavelength in a specific wavelength range, and the half value width of the peak were determined.
(3) Contrast A 30W fluorescent lamp was lighted from a position placed at an upward angle of 45 degree to the horizontal direction on a light-emitting test CRT whose display surface was orthogonal to the horizontal direction, and the maximum brightness on the screen was measured using a brightness photometer (manufactured by Minolta Co.) at a position which was directly not irradiated with the regular reflection light and was placed at an upward angle of 30 degree to the approximately horizontal direction. In addition, the 30W fluorescent lamp was lighted from the position placed at an upward angle of 45 degree to the horizontal direction on a light-non-emitting test CRT whose electric source was switched off, and the minimum brightness on the screen was measured using the brightness photometer (manufactured by Minolta Co.) at the position which was directly not irradiated with the regular reflection light and was placed at an upward angle of 30 degree to the approximately horizontal direction. The obtained maximum brightness was divided by the obtained minimum brightness to determine a contrast 1 (maximum brightness/the minimum brightness). Subsequently, the sticking agent side of a test sample was pressure-adhered to the CRT, and the maximum brightness and the minimum brightness were measured by the same methods as described above and, with the sane manner as above-mentioned, the obtained maximum brightness was divided by the obtained minimum brightness to determine a contrast 2 (maximum brightness/the minimum brightness). The film was evaluated according to the following standards under a concept that the larger the value of (contrast 2/contract 1)×100(%)

is, the better the film is.

⊚: (contrast 2/contract 1)×100(%) is not less than 120%.

○: (contrast 2/contract 1)×100(%) is not less than 100% and less than 120%.

X: (contrast 2/contract 1)×100(%) is less than 100%.

(4) Hue Deviation

L*, a* and b* in the L*a*b* color system were determined from the transmission spectrum of a test sample for standard light A according to JIS Z8729, and an ab chroma (C*ab) was calculated and determined using the following equation.

$$C*ab=((a*)^2+(b*)^2)^{1/2}$$

The deviation of the chrome from achromatic color was evaluated from the obtained C*ab according to the following standards.

⊚: C*ab is less than 10.

○: C*ab is not less than 10 and less than 20.

X: C*ab is not less than 20.

(5) Color Purity

The chromaticity coordinates (CIE color system) of light emitters (blue, green, red) emitting light from a cathode-ray tube were calculated, respectively, according to JIS Z8701. Similarly, a test sample was adhered to the cathode-ray tube, and the chromaticity coordinates of the light emitters were calculated, respectively. The color purities of three primary colors were evaluated according to the following standards. However, it was judged that the chromaticity coordinates were improved, when the chromaticity coordinates of the light emitters approached the chromaticity coordinates of single wavelengths (460 nm, 560 nm, 620 nm) by the adhesion of the sample.

⊚: All the color purities of the three primary colors were improved.

○: The color purities of two primary colors among the three primary colors were improved, but the remainder was lowered.

Δ: The color purity of either one of the three primary colors was improved, but the remainders were lowered.

X: All the color purities of the three primary colors were lowered or not changed.

(6) Back Side Reflectance

The side of the adhesive layer of an adhesive film was defined as the back side (an arbitrary one side, when both the sides were coated). A point light source was irradiated at an angle of 45 degree to the surface of a biaxially oriented polyester film, and the reflected light at a place apart from the main reflection at a distance of only d/0.707 (wherein d is the thickness of the film) was defined as a back side reflectance. A value obtained by dividing the back side reflection by the light quantity of the point light source was defined as the reflectance. The reflectance was evaluated according to the following standards.

○: the back side reflectance was not more than 0.4%.

X: the back side reflectance exceeded 0.4%.

(7) Adhesion a. To Adhesive

An acrylic sticking agent is coated on the adhesive layer side of the adhesive film in a thickness of 10 μm. After left in a 60° C., 80% RH thermal is hygrostat tank for 24 hours, the film was adhered to an epoxy resin-based adhesive, and then subjected to a peeling test. The film was evaluated according to the following standards.

⊚: the adhesive force was strong in such the extent as the substrate film was broken.

○: the film was peeled, but had practicality.

X: the film was easily peeled, and did not have practicality.

b. To Hard Coat

The test for the resistance to the hard coat was carried out by forming a 5 μm-thick hard coat layer on the adhesive layer side of an adhesive film, by applying a lattice pattern cross cut treatment (100 squares each having a side length of 1 mm) to the formed hard coat layer, by adhering a 24 mm-wide cellophane tape (produced by Nichiban Co.) to the treated hard coat layer, by rapidly peeling the cellophane tape at a peeling angle of 180 degree, by observing the peeled surface, and then by evaluating the resistance to the hard coat according to the following standards.

⊚⊚: the peeled area was less than 10% . . . extremely good adhesive force.

⊚: the peeled area was not less than 10% and less than 20% . . . good adhesive force.

○: the peeled area was not less than 20% and less than 30% . . . slightly good adhesive force.

Δ: the peeled area was not less than 30% and less than 40% . . . bad adhesive force.

X: the peeled area exceeded 40% . . . extremely bad adhesive force.

(8) Detection of Ionic Low Molecular Compound

The adhesive layer side of an adhesive film was analyzed by an XPS (X-ray photoelectron spectroscopy) surface analysis method to measure the content of an ionic low molecular compound. The content of the detected ionic low molecular compound was indicated as follows.

○: the content of the ionic low molecular compound was not more than 1,000 ppm.

X: the content of the ionic low molecular compound exceeded 1,000 ppm.

(9) Film/Film Frictional Coefficient

The tensile force (F) of the film/film was detected by putting a fixed glass plate on the lower side of two film samples wherein the back side of one of the films was overlapped on the front side of the other, by taking off the lower film (the film contacting with the glass plate) by the use of a constant speed roll (10 cm/minute), and by fixing one end (the end opposite to the direction for taking off the lower film) of the upper film. A sled loaded on the upper film had a lower side area of 50 cm² (80 mm×62.5 mm) and a weight (W) of 1.2 kg. The film-contacting side of the sled was produced from neoprene rubber having a hardness of 80 degree. The coefficient of static friction ($\mu_s$) was calculated according to the following equation.

$$\mu_s = F(g)/W(g)$$

(10) Refractive Index of Adhesive Layer in Thickness Direction

The refractive index of the adhesive layer in the thickness direction was measured by the use of an Abbe refractometer with sodium D beam as a light source. Methylene iodide was used as a mount liquid, and the atmosphere for the measurement was 25° C. and 65% RH.

(11) Evaluation of Surface Reflection as Visibility Improvement Film

Outside light of 700lx was irradiated on a light-non-emitting test CRT, and reflection brightness 1 was measured using a brightness photometer (manufactured by Minolta Co.). Subsequently, a sample film was adhered to the CRT with a sticking agent, and reflection brightness 2 was again measured. The value of (reflection brightness 2/reflection brightness 1)×100% was evaluated into the following classes.

⊚: (reflection brightness 2/reflection brightness 1)×100% was less than 20%.

○: (reflection brightness 2/reflection brightness 1)×100% was not less than 20% and less than 30%.

Δ: (reflection brightness 2/reflection brightness 1)×100% was not less than 30% and less than 40%.

X: (reflection brightness 2/reflection brightness 1)×100% was not less than 40%.

(12) Abrasion Resistance as Visibility Improvement Film

A sample was furnished with an abrasion test (load: 1 kg, reciprocated 50 times) using a square pad (area: 6.25 cm²) mounted with steel wool #000 of a reciprocation type abrasion tester, and a difference (Δ haze), between both haze values before and after the test, was calculated with the following equation.

Δhaze=(haze value after an abrasion test)−(haze value before the abrasion test).

The abrasion resistance was evaluated from the obtained Δ haze as follows.

○: Δ haze was less than 10.

Δ: Δ haze was not less than 10 and less than 20.

X: Δ haze exceeded 20.

(13) Light Resistance

The evaluation of the light resistance was carried out by irradiating a sample film with light having a wavelength of 300 to 800 nm at an irradiation illumination of 765 W/m² for 100 hours by the use of a xenon weather meter manufactured by Toyo Seiki Co. (Ltd.), by measuring a tri-stimulus value (including luminous transmission factor), L*a*b* (chromaticity coordinates), YI (yellowing degree) before and after the irradiation by the use of a color-difference meter (SZS-Σ90, manufactured by Nippon Denshoku Ind. (Ltd.)), and then by evaluating the measured values according to the following standards. ○ shows a light resistance level which does not have a problem for the employment of the film indoor, and ⊚ shows a light resistance level which does not have a problem for the employment of the film indoor and outdoor.

⊚: the change of luminous transmission factor was within 3%, and the yellowing degree was within 4.

○: the change of luminous transmission factor exceeded 3%, and/or the yellowing degree exceeded 4.

(14) Hue Irregularity

L*a*b* (chromaticity coordinates) for C light source were measured at 50 points randomly selected from the surface of a sample film by the use of a color-difference meter, SZS-Σ90, manufactured by Nippon Denshoku Ind. (Ltd.), and a ΔC*ab was obtained from the maximum values ($a^*_{max}$, $b^*_{max}$) and the minimum values ($a^*_{min}$, $b^*_{min}$) according to the following equation.

$$\Delta C^*ab = ((a^*_{max} - a^*_{min})^2 + (b^*_{max} - b^*_{min})^2)^{1/2}$$

The irregularity of the hue within the surface was evaluated from the obtained ΔC*ab according the following standards.

⊚: ΔC*ab was less than 3, and the film could highly suitably be used.

○: ΔC*ab was not less than 3 and less than 5, and the film did not have a problem in practical applications.

X: ΔC*ab was not less than 5, and the film had a problem in practical applications.

Example 1

Polyethylene terephthalate, having an intrinsic viscosity of 0.65 (35° C., an ortho-chlorophenol solution) and containing porous silica having an average particle diameter of 1.7 μm in an amount of 0.007 percent by weight, was mixed with the granules of a dyestuff (trade name: HS-299, produced by Mitsui Chem. Co.) in an amount of 0.05 percent by weight, using a small single screw feeder. The obtained polyethylene terephthalate composition was melted in an extruder (shear rate: 65 (1/second), retention time: 600 seconds), extruded from a die, and then cooled with a cooling drum by a conventional method to produce the non-stretched film.

Subsequently, without being once rolled up, said non-stretched film was stretched at a stretch ratio of 3.5 in the longitudinal direction in a state heated at 90° C., stretched at a stretch ratio of 3.8 in the lateral direction in a state heated at 95° C., and then subjected to a stretch heat treatment at 230° C. to obtain the biaxially oriented polyester film having a thickness of 75 μm. The evaluation results of the optical characteristics of the obtained biaxially oriented polyester film are shown in Table 1.

Example 2

The same operations as in Example 1 were repeated, changing the thickness into 200 μm, and except the change of the coloring matter into the 20:1 weight ratio blend of a dyestuff (trade name: HS-307, produced by Mitsui Chem. Co.): a dyestuff (trade name: Kayaset Yellow EG, produced by Nippon Kayaku Co.), and the change of the amount of the coloring matter into 0.02 percent by weight. The evaluation results of the optical characteristics of the obtained biaxially oriented polyester film are shown in Table 1.

Example 3

Polyethylene naphthalate, having an intrinsic viscosity of 0.64 (35° C., an ortho-chlorophenol solution) and containing a dyestuff (trade name; HS-299) produced by Mitsui Chem.

Co.) in an amount of 0.04 percent by weight and porous silica having an average particle diameter of 1.7 μm in an amount of 0.007 percent by weight, was melted in an extruder (shear rate: 65 (1/second), retention time: 600 seconds), extruded from a die, and then cooled with a cooling drum by a conventional method to produce the non-stretched film.

Subsequently, without being once rolled up, said non-stretched film was stretched at a stretch ratio of 3.5 in the longitudinal direction in a state heated at 140° C., stretched at a stretch ratio of 3.8 in the lateral direction in a state heated at 135° C., and then subjected to a stretch heat treatment at 230° C. to obtain the biaxially oriented polyester film having a thickness of 50 μm. The evaluation results of the optical characteristics of the obtained biaxially oriented polyester film are shown in Table 1.

Example 4

The same operations as in Example 1 were repeated except the change of the coloring matter into the 10:3:3 weight ratio blend of a dyestuff (trade name: HS-296, produced by Mitsui Chem. Co.): a dyestuff (trade name: Kayaset Orange AN, produced by Nippon Kayaku Co.): a dyestuff (trade name: Kayaset Green AB, produced by Nippon Kayaku Co.), and the change of the amount of the coloring matter into 0.06 percent by is weight. The evaluation results of the optical characteristics of the obtained biaxially oriented polyester film are shown in Table 1.

Comparative Examples 1 to 4

The same operations as in Example 1 were repeated except the changes of the coloring matters and its amount as shown in Table 1. The evaluation results of the optical characteristics of the obtained biaxially oriented polyester films are shown in Table 1.

C: a weight ratio 10:3:3 blend of a dyestuff (trade name: HS-296) produced by Mitsui Chem. Co., a dyestuff (trade name: Kayaset Orange AN) produced by Nippon Kayaku Co. and a dyestuff (trade name: Kayaset Green AB) produced by Nippon Kayaku Co.

D: a dyestuff (trade name: Kayaset Blue A2R) produced by Nippon Kayaku Co.

E: a dyestuff (trade name: Kayaset Black AN) produced by Nippon Kayaku Co.

F: a pigment, Carbon Black (trade name: 4818 Black 15F-7.5) produced by Dainichi Seika Co.

Example 5

Polyethylene terephthalate, having an intrinsic viscosity of 0.65 (35° C., an ortho-chlorophenol solution) and containing porous silica having an average particle diameter of 1.7 μm in an amount of 0.007 percent by weight, was mixed with the granules of a dyestuff (trade name: HS-299, produced by Mitsui Chem. Co.) in an amount of 0.05 percent by weight, using of a small single screw feeder. The obtained polyethylene terephthalate composition was melted in an extruder (shear rate: 65 (1/second), retention time: 600 seconds), extruded from a die, and then cooled with a cooling drum by a conventional method to produce the non-stretched film.

Subsequently, without being once rolled up, said non-stretched film was stretched at a stretch ratio of 3.5 in the longitudinal direction in a state heated at 90° C., and both the sides of the stretched film were uniformly coated with a 8% concentration aqueous liquid of the below-described composition for coating films by the use of a roll coater. Then, the coated film was dried at 95° C., simultaneously stretched at, a stretch ratio of 3.8 in the lateral direction at 120° C., and then thermally set at 230° C. to obtain the adhesive film having a thickness of 75 μm. The obtained adhesive film had

TABLE 1

|  | Thickness (μM) | Polyester | Coloring matter (wt %) | Coloring matter (g/m²) | Wavelength (X) of absorption peak | Half value width of absorption peak | $T_x/T_{540}$ | $T_{450}/T_{540}$ | $T_{620}/T_{540}$ | Total light transmittance | Haze value | Contrast | Color purity | Hue deviation | Hue irregularity |
|---|---|---|---|---|---|---|---|---|---|---|---|---|---|---|---|
| Example 1 | 75 | PET | A(0.05) | 0.053 | 594 nm | 32 nm | 0.27 | 1.23 | 1.23 | ○ | ◎ | ◎ | ◎ | ○ | ◎ |
| Example 2 | 200 | PET | B(0.02) | 0.056 | 576 nm | 46 nm | 0.37 | 1.29 | 1.29 | ○ | ◎ | ◎ | ◎ | ◎ | ◎ |
| Example 3 | 75 | PEN | A(0.04) | 0.042 | 594 nm | 32 nm | 0.25 | 1.19 | 1.19 | ○ | ◎ | ○ | ◎ | ○ | ◎ |
| Example 4 | 75 | PET | C(0.06) | 0.063 | 585 nm | 44 nm | 0.22 | 1.02 | 0.99 | ○ | ◎ | ◎ | ◎ | ◎ | ◎ |
| Comparative example 1 | 75 | PET | None | — | None | None | — | 1.00 | 1.00 | ○ | ◎ | x | x | ◎ | ◎ |
| Comparative example 2 | 75 | PET | D(0.10) | 0.105 | 598 nm | 140 nm | 0.83 | 1.84 | 0.85 | Δ | ◎ | ○ | Δ | x | ◎ |
| Comparative example 3 | 75 | PET | E(0.10) | 0.105 | 610 nm | Not specified | 0.95 | 1.00 | 1.00 | Δ | ◎ | ◎ | x | ◎ | ◎ |
| Comparative example 4 | 75 | PET | F(0.10) | 0.105 | None | None | — | 0.73 | 1.23 | Δ | ◎ | ◎ | x | ○ | ◎ |

In Table 1, PET and PEN designate polyethylene terephthalate and polyethylene-2,6-naphthalenedicarboxylate, respectively. The marks of the coloring matter designate the following dyestuffs and pigment.

A: a dyestuff (trade name: HS-299) produced by Mitsui Chem. Co.

B: a weight ratio 20:1 blend of a dyestuff (trade name: HS-307) produced by Mitsui Chem. Co. and a dyestuff (trade name: Kayaset Yellow EG) produced by Nippon Kayaku Co.

a coating film thickness of 0.15 μm and a refractive index of 1.559 in the thickness direction. The evaluation results of the obtained adhesive film are shown in Table 2.

Composition for Coating Films

75 Percent by weight of a copolyester having a Tg of 85° C. and synthesized from an acid component comprising 2,6-naphthalenedicarboxylic acid (70 percent by mole), isophthalic acid (24 percent by mole), and sodium 5-sulfoisophthalate (6 percent by mole), and a glycol component comprising ethylene glycol (90 percent by mole) and diethylene glycol (30 percent by mole), 15 percent by weight of an acrylic copolymer having a Tg of 0° C. and synthesized from components comprising 15 percent by mole of methyl methacrylate, 75 percent by mole of ethyl acrylate, 5 percent by mole of N-methylolacrylamide and 5 percent by mole of 2-hydroxyethyl methacrylate, and, 10 percent by weight of polyoxyethylene(N=7) lauryl ether.

Examples 6 to 8

Except the changes in the components of compositions for coating films as shown in Table 2, the same operations as in Example 6 were performed to obtain the optical easily adhesive films having thicknesses of 75 μm, respectively. The thicknesses of the coating films were 0.15 μm, respectively. The evaluation results of the obtained adhesive films are shown in Table 2.

side of the adhesive film in Example 5 by the use of a roll coater so as to give a cured coating film thickness of 5 μm.
UV Light-Curable Composition

| Pentaerythriol acrylate | 45 percent by weight |
| N-methylol acrylamide | 40 percent by weight |
| N-vinyl pyrrolidone | 10 percent by weight |
| 1-hydroxycyclohexyl phenyl ketone | 5 percent by weight |

Subsequently, the coating film was irradiated with ultraviolet light for 30 second by the use of a high-pressure mercury lamp having a luminous intensity of 80 W/cm to form the cured hard coat layer.

Subsequently, an antireflection layer comprising the laminate of a low refractive index layer (SiO$_2$, 30 nm), a high refractive index layer (TiO$_2$, 30 nm), a low refractive index layer (SiO$_2$, 30 nm), a high refractive index layer (TiO$_2$, 100

TABLE 2

| | Composition for adhesive layer (percent by weight) | | | | | | Surface | | | |
| | Aqueous polyester component | Acrylic component | Additive | Surfactant | Reflectance of back side | Frictional coefficient | Refractive index in thickness direction | roughness of adhesive layer (nm) | Adhesive force | |
| | | | | | | | | | Adhesive | Hard coat |
|---|---|---|---|---|---|---|---|---|---|---|
| Example 5 | P1(75) | H(15) | — | Y1(10) | ○ | 0.75 | 1.559 | 7 | ⊚ | ⊚⊚ |
| Example 6 | P1(70) | H(15) | J1(5) | Y1(10) | ○ | 0.70 | 1.552 | 7 | ⊚ | ⊚⊚ |
| Example 7 | P1(75) | H(10) | J1(5) | Y1(10) | ○ | 0.78 | 1.565 | 7 | ○ | ⊚⊚ |
| Example 8 | P1(67) | H(15) | J2(8) | Y1(10) | ○ | 0.69 | 1.550 | 7 | ○ | ⊚⊚ |

The marks (P1, H, J1, J2, and Y1) of the compositions for coating films in Table 2 designate the following polymers or compounds, respectively.

Aqueous Polyester

P1: a copolyester (Tg 85° C.) produced from an acid component comprising 2,6-naphthalenedicarboxylic acid (70 percent by mole), isophthalic acid (24 percent by mole), and sodium 5-sulfoisophthalate (6 percent by mole) and a glycol component comprising ethylene glycol (90 percent by mole) and diethylene glycol (10 percent by mole).

Acryl

H: an acrylic copolymer having a Tg of 0° C. and synthesized from 15 percent by mole of methyl methacrylate, 75 percent by mole of ethyl acrylate, 5 percent by mole of N-methylolacrylamide and 5 percent by mole of 2-hydroxyethyl methacrylate.

Additive

J1: silica filler (average particle diameter: 100 nm)

J2: a mixture of silica filler (average particle diameter: 100 nm) and carnauba wax in a weight ratio 5:3.

Surfactant

Y1: polyoxyethylene(N=7)lauryl ether

Example 9

A UV light-curable composition comprising the following components was uniformly coated on the coating film of one nm), and a low refractive index layer (SiO$_2$, 100 nm) in this order was formed on said hard coat layer by a spattering method. The evaluation results of the obtained optical hard coat film are shown in Table 3.

Examples 10 to 12

The same operations as in Example 9 were repeated, except that the polymers and the film-forming conditions related to stretch temperatures and stretch ratios of biaxially oriented polyester films were changed into those of Experiments 2 to 4 as shown in Table 1. The evaluation results of the obtained optical hard coat films are shown in Table 3.

Comparative Examples 5 to 8

The same operations as in Example 9 were repeated, except that the polymers and the film-forming conditions related to stretch temperatures and stretch ratios of biaxially oriented polyester films were changed into those of Comparative experiments 1 to 4 as shown in Table 1 and also except that a coating film composition used for forming adhesive layers was changed as shown below. The evaluation results of the obtained optical hard coat films are shown in Table 3.

Composition for Coating Films 75 percent by weight of a copolyester having a Tg of 85° C. and synthesized from an acid component comprising 2,6-naphthalenedicarboxylic acid (70 percent by mole), isophthalic acid (24 percent by mole), and sodium 5-sulfoisophthalate (6 percent by mole), and a glycol component comprising ethylene glycol (90 percent by mole) and diethylene glycol (30 percent by mole), 15 percent by weight of an acrylic copolymer having a Tg of 0° C. and synthesized from components comprising 15 percent by mole of methyl methacrylate, 75 percent by mole of ethyl acrylate, 5 percent by mole of N-methylolacrylamide and 5 percent by mole of 2-hydroxyethyl methacrylate, and, 10 percent by weight of polyoxyethylene(N=7) lauryl ether.

Composition for Coating Films

75 Percent by weight of a copolyester having a Tg of 85° C. and synthesized from an acid component comprising 2,6-naphthalenedicarboxylic acid (70 percent by mole), isophthalic acid (24 percent by mole), and sodium 5-sulfoisophthalate (6 percent by mole), and a glycol component comprising ethylene glycol (90 percent by mole) and diethylene glycol (30 percent by mole), 15 percent by weight of an acrylic copolymer having a Tg of 0° C. and synthesized from components comprising 15 percent by mole of methyl methacrylate, 75 percent by mole of ethyl acrylate, 5 percent by mole of N-methylolacrylamide and 5 percent by mole of 2-hydroxyethyl methacrylate, and, 10 percent by weight of polyoxyethylene(N=7) lauryl ether.

TABLE 3

| | | Thick-ness | Coloring matter | | Haze | Con-trast | Total light trans-mittance | Color purity | Hue de-vi-ation | Surface re-flection | Abrasion resis-tance | Hue ir-regu-larity |
|---|---|---|---|---|---|---|---|---|---|---|---|---|
| | Base film | (μM) | (wt %) | (g/m²) | value | | | | | | | |
| Example 9 | Example 1 | 75 | A(0.05) | 0.053 | ◎ | ◎ | ○ | ◎ | ○ | ◎ | ○ | ◎ |
| Example 10 | Example 2 | 200 | B(0.03) | 0.056 | ◎ | ◎ | ○ | ◎ | ◎ | ◎ | ○ | ◎ |
| Example 11 | Example 3 | 50 | A(0.04) | 0.042 | ◎ | ○ | ○ | ◎ | ○ | ◎ | ○ | ◎ |
| Example 12 | Example 4 | 75 | C(0.06) | 0.063 | ◎ | ◎ | ○ | ◎ | ◎ | ◎ | ○ | ◎ |
| Comparative example 5 | Comparative example 1 | 75 | None | — | ◎ | × | ○ | × | ◎ | ◎ | ○ | ◎ |
| Comparative example 6 | Comparative example 2 | 75 | D(101) | 0.105 | ◎ | ○ | △ | △ | × | ◎ | ○ | ◎ |
| Comparative example 7 | Comparative example 3 | 75 | E(101) | 0.105 | ◎ | ◎ | △ | × | ◎ | ◎ | ○ | ◎ |
| Comparative example 8 | Comparative example 4 | 75 | H(101) | 0.105 | × | ◎ | △ | × | ○ | ◎ | ○ | ◎ |

Tables 1 to 3 will be considered as follows. As obviously shown in Table 1, the biaxially oriented polyester films (Examples 1 to 4) of the present invention had high color purities, contrasts and transmittances at the same time. Further, the adhesive films (Examples 5 to 8) formed by disposing the adhesive layers on the biaxially oriented polyester films of the present invention had the good adhesive properties to the hard coats and the adhesives for glass without deteriorating the optical characteristics, as clearly shown in Table 2. In addition, the hard coat films (Examples 9 to 12) formed by disposing the hard coat layers and the antireflection layers on the optical adhesive films of the present invention were excellent at all the points of the color purities, contrasts, transmittances, abrasion resistance and antireflection abilities. On the contrary, the biaxially oriented polyester films in the Comparative examples 1 to 6 and the hard coat films in the Comparative examples 7 to 12, which were not satisfying either of the requirements of the present invention, gave only the films having poor optical characteristics.

Example 13

Polyethylene terephthalate (intrinsic viscosity [η]=0.65) containing a dyestuff (trade name: HS-299, produced by Mitsui Chem. Co.) in an amount of 0.01 percent by weight and porous silica having an average particle diameter of 1.7μm in an amount of 0.007 percent by weight was extruded from a die in a melted state, and then cooled with a cooling drum by a conventional method to produce the non-stretched film. Subsequently, without being once rolled up, both the sides of said non-stretched film was uniformly coated with a 8% concentration aqueous liquid of the below-described composition for coating films by the use of a roll coater. The coated film was dried at 95° C., simultaneously stretched at a stretch ratio of 3.8 in the lateral direction at 120° C., and then subjected to a stretch heat treatment at 230° C. to obtain the colored biaxially oriented polyester film having a thickness of 188 μm.

One side of the obtained colored biaxially oriented polyester film was coated with a hard coat agent (trade name: PETD-31, produced by Dainichi Seika Co.) for forming hard coat layers by a roll coating method so as to give a dry coat thickness of 6 μm, dried, and then irradiated with electron beams under conditions of 175 kv and 10 Mrad to form the hard coat film.

On the other hand, the side opposite to the hard coat layer laminated to the colored biaxially oriented polyester film was coated with a sticking agent for forming a sticky layer (the composition was shown in Table 4) by a roll coating method so as to give a dry thickness of 20 μm, thus obtaining the colored hard coat film having a layer configuration 1 shown in FIG. 4. The sticky layer surface of the obtained colored hard coat film was laminated to a silicone-treated PET film as a separator film (release film). The characteristics of the obtained colored hard coat film are shown in Table 8.

TABLE 4

| Sticking agent | Acrylic sticking agent (produced by Soken Chem. Co., trade name: SK DYNE 1425 (D-90)) | 3,600 parts |
|---|---|---|
| Solvent | Ethyl acetate | 10,000 parts |

Example 14

Except that a coloring matter was not added to a transparent substrate film and that a sticking agent for forming a sticky layer was changed into a sticky agent comprising a composition shown in Table 5, the same operations as those in Example 13 were repeated to obtain the colored hard coat film having a layer configuration 2 shown in FIG. 5. The characteristics of the obtained colored hard coat film are shown in Table 8.

TABLE 5

| Dyestuff | Trade name: HS-307, produced by Mitsui Chem. Co | 3.2 parts |
|---|---|---|
| | Trade name: Kayaset Yellow EG, produced by Nippon Kayaku | 0.16 part |
| Sticking agent | Acrylic sticking agent (Trade name: SK DYNE 1425 (D-90), produced by Soken Chem. Co.) | 3,600 parts |
| Solvent | Ethyl acetate | 10,000 parts |

Example 15

Except the non-addition of a coloring matter to a transparent substrate, the change of a hard coat agent for forming a hard coat layer into a hard coat agent comprising components shown in Table 6, the change in the dry thickness of the hard coat layer into 20 µm, and the change in the conditions of electron beam irradiation for forming the hard coat layer into conditions comprising 185 kv and 1,020 Mrad, the same operations as those in Example 1 were repeated to obtain the colored hard coat film having a layer configuration 3 shown in FIG. 6. The characteristics of the obtained colored hard coat film are shown in Table 8.

TABLE 6

| Dyestuff | Trade name; HS-307, produced by Mitsui Chem. Co. | 3.2 parts |
|---|---|---|
| | Trade name; Kayaset Yellow EG, produced by Nippon Kayaku Co. | 0.96 part |
| | Trade name; Kayaset Green AB, produced by Nippon Kayaku Co. | 0.96 part |
| Hard coat agent | Trade name; KZ7817A-1, produced by Nippon Gosei Rubber Co. | 3,600 parts |
| Solvent | Methyl ethyl ketone | 2,000 parts |
| | Methyl isobutyl ketone | 2,000 parts |

Example 16

One side of a polyethylene terephthalate film (trade name: OPFW-188, produced by Teijin Ltd.) which has a thickness of 188 µm and whose both sides have been subjected to easily adhesive treatments was coated with a colored coating agent (components are shown in Table 7) for forming a colored layer by a roll coating method so as to give a dry thickness of 10 µm, dried, and then irradiated with electron beams under conditions of 175 kv and 5 Mrad to obtain the hard coat film comprising the colored layer and the transparent substrate film.

TABLE 7

| Dyestuff | Trade name; HS-299, produced by Mitsui Chem. Co. | 6.5 parts |
|---|---|---|
| Binder resin | Polyester resin (trade name; Vylon 240, produced by Toyobo Co.) | 1,800 parts |
| Cross-linking monomer | Acrylate monomer | 1,800 parts |
| Solvent | Toluene | 2,400 parts |
| | Methyl ethyl ketone | 2,300 parts |
| | Cyclohexanone | 2,000 parts |

Subsequently, the transparent substrate film side of said hard coat film was coated with a hard coat agent (trade name: PETD-31, produced by Dainichi Seika Co.) for forming a hard coat layer by a roll coating method so as to give a dry thickness of 6 µm, dried, and then irradiated with electron beams under conditions of 175 kv and 10 Mrad to form the hard coat layer. On the other hand, the colored layer side of said hard coat film was coated with a sticking agent (trade name; SK DYNE 1425 (D-90), produced by Soken Chem. Co.) for forming a sticky layer by a roll coating method so as to give a dry thickness of 20 µm, thus obtaining the colored hard coat film having the layer configuration 4 shown in FIG. 7. The sticky layer side of the obtained colored hard coat film was adhered to a surface-silicone treated PET film having a thickness of 5 µm as a separator film (release film). The characteristics of the obtained colored hard coat film are shown in Table 8.

Example 17

Except that the position of a colored layer was changed from a place between a sticky layer and a transparent substrate film to a place between a hard coat layer and the transparent substrate film, the same operations as those in Example 16 were repeated to obtain the colored hard coat film having a layer configuration 5 shown in FIG. 8. The characteristics of the obtained colored hard coat film are shown in Table 8.

Example 18

A 50 µm-thick biaxially oriented polyethylene terephthalate film (trade name; A31-50, produced by Teijin Ltd.) was prepared as a shaping film, and one side of the film was coated with a coating liquid, containing 100 parts by weight of $ZrO_2$ fine particles (trade name; No. 1275, produced by Sumitomo Osaka Cement Co. (limited)) and 0.3 part by weight of a binder resin (ionizing radiation-curable organic silicon compound), by the use of a wire bar to form the non-cured coating film for forming a middle refractive index layer (refractive index: 1.74) having a dry thickness (thickness when dried) of 57 nm.

Subsequently, the hard coat film, used in the above-described Example 16, which is before the formation of the hard coat layer and comprising the colored layer and the transparent substrate film, was prepared. The transparent substrate film side of said hard coat film was coated with a hard coat agent (trade name; PETD-31, produced by Dainichi Seika Co.) by a roll coating method so as to give a dry thickness of 6 µm, and then subjected to a drying treatment of solvent component to form the non-cured hard coat layer. Then, the non-cured middle refractive index layer disposed on the above-described shaping film was laminated and pressed to the non-cured hard coat layer disposed on the transparent substrate film of the above-described hard coat film. The formed laminate was irradiated with ultraviolet light under a condition of 480 mJ (10 m/min) to cure the non-cured middle refractive index layer and the non-cured hard coat layer, thus forming the cured middle refractive index layer and the cured hard coat layer. The above-described shaping film adhered to the middle refractive index layer side was peeled off to obtain the colored hard coat film comprising the colored layer, the transparent substrate film, the hard coat layer and the middle refractive index layer.

Further, ITO was spattered (refractive index: 2.0, vacuum degree: $5 \times 10^{-6}$ torr, substrate temperature: room temperature, argon: 100 scc/min, oxygen: 5 scc/min) on the middle refractive index side of the above-described hard coat film under a condition comprising a deposit rate of 1.6 angstrom/s to form the high refractive index layer having a thickness of 105 nm. Subsequently, a low refractive index layer of SiO$_2$ (refractive index: 1.46) of 85 nm thickness was further formed on the high refractive index layer of said colored hard coat film, at a vacuum degree of 5×10$^{-6}$ torr, at a substrate temperature of room temperature and at a evaporation rate of 26 angstrom/s. Further, the low refractive index layer side of said colored hard coat film was coated with a fluorosurfactant (trade name; FC-722, produced by 3M Corp.) by the use of a wire bar to form a stain-proofing layer having a thickness of 2 nm. On the other hand, the colored layer side of said colored hard coat film was coated with the sticking agent used for forming the sticky layer in the above-described Example 13 by a roll coating method to form the sticky layer having a dry thickness of 20 μm, and then the antireflection colored hard coat film imparted with stain-proofing property having a layer configuration 6 shown in FIG. 9 was obtained. The sticky layer side of the obtained colored hard coat film was protected with a silicone-treated, 50 ∥m-thick protection film from the viewpoint of handleability. The characteristics of the obtained colored hard coat film were shown in Table 8.

Example 19

Except that a colored layer was not disposed and that the colored biaxially oriented polyester film of Example 13 was used as a biaxially oriented polyester film, the same operations as those in Example 18 were repeated to obtain the stain-proofing property-imparted antireflection colored hard coat film having a layer configuration 7 shown in FIG. 10. The characteristics of the obtained colored hard coat film are shown in Table 8.

Comparative Example 9

A hard coat film having the same layer configuration as that in Example 13 except that a coloring matter was not added was obtained. The characteristics of the obtained colored hard coat film are shown in Table 8.

Comparative Example 10

Except that a coloring matter was changed into a dyestuff (trade name; Kayaset Blue A2R, produced by Nippon Kayaku Co.), and that the amount of the added coloring matter was changed into 20 parts by weight, the same operations as those in Example 13 were repeated. The characteristics of the obtained colored hard coat film are shown in Table 8.

Comparative Example 11

Except that a coloring matter was changed into a dyestuff (trade name; Kayaset Black AN, produced by Nippon Kayaku Co.), and that the amount of the added coloring matter was changed into 20 parts by weight, the same operations as those in Example 13 were repeated. The characteristics of the obtained colored hard coat film are shown in Table 8.

Comparative Example 12

Except that a coloring matter was changed into a pigment (trade name; 4818 Black 15F-7, produced by Dainichi Seika Co.), and that the amount of the added coloring matter was changed into 20 parts by weight, the same operations as those in Example 13 were repeated. The characteristics of the obtained colored hard coat film are shown in Table 8.

TABLE 8

| | Layer Con-figu-ration | Coloring matter | | Maximum absorption peak | | $T_x/$ $T_{540}$ | $T_{450}/$ $T_{540}$ | $T_{620}/$ $T_{540}$ | Total light trans-mittance | Haze value | Con-trast | Color purity | Hue de-vi-ation | Hue ir-regu-larity |
| | | Kind | (g/m²) | Wave-length (X) (nm) | Half-value width (nm) | | | | | | | | | |
|---|---|---|---|---|---|---|---|---|---|---|---|---|---|---|
| Example 13 | FIG. 4 | A | 0.026 | 594 | 32 | 0.28 | 1.23 | 1.20 | ○ | ◉ | ◉ | ◉ | ○ | ◉ |
| Example 14 | FIG. 5 | A | 0.024 | 594 | 32 | 0.27 | 1.22 | 1.21 | ○ | ◉ | ◉ | ◉ | ○ | ○ |
| Example 15 | FIG. 6 | A | 0.037 | 594 | 32 | 0.26 | 1.22 | 1.22 | ○ | ◉ | ◉ | ◉ | ○ | ○ |
| Example 16 | FIG. 7 | B | 0.050 | 576 | 46 | 0.37 | 1.29 | 1.29 | ○ | ◉ | ◉ | ◉ | ◉ | ○ |
| Example 17 | FIG. 8 | C | 0.050 | 585 | 44 | 0.22 | 1.02 | 0.99 | ○ | ◉ | ◉ | ◉ | ◉ | ○ |
| Example 18 | FIG. 9 | A | 0.050 | 594 | 32 | 0.27 | 1.22 | 1.20 | ○ | ◉ | ◉ | ◉ | ○ | ○ |
| Example 19 | FIG. 10 | A | 0.024 | 594 | 32 | 0.28 | 1.23 | 1.20 | ○ | ◉ | ◉ | ◉ | ○ | ◉ |
| Comparative example 9 | FIG. 4 | None | — | None | None | — | 1.00 | 1.00 | ○ | ◉ | x | x | ◉ | ◉ |
| Comparative example 10 | FIG. 4 | D | 0.132 | 598 | 140 | 0.83 | 1.84 | 0.85 | Δ | ◉ | ○ | Δ | x | ◉ |
| Comparative example 11 | FIG. 4 | E | 0.132 | 610 | Not specified | 0.95 | 1.00 | 1.00 | Δ | ◉ | ◉ | x | ◉ | ◉ |
| Comparative example 12 | FIG. 4 | F | 0.132 | None | None | — | 0.73 | 1.23 | Δ | x | ◉ | x | ○ | ◉ |

Therein, the coloring matters A to F in the above-described Table 8 designate the following dyestuffs and pigment.

A: a dyestuff (trade name: HS-299) produced by Mitsui Chem. Co.

B: a weight ratio 20:1 blend of a dyestuff (trade name: HS-307, produced by Mitsui Chem. Co.) and a dyestuff (trade name: Kayaset Yellow EG, produced by Nippon Kayaku Co.) C: a weight ratio 10:3:3 blend of a dyestuff (trade name: HS-296, produced by Mitsui Chem. Co.), a dyestuff (trade name: Kayaset Orange AN, produced by Nippon Kayaku Co.) and a dyestuff (trade name: Kayaset Green AB, produced by Nippon Kayaku Co.)

D: a dyestuff (trade name: Kayaset Blue A2R) produced by Nippon Kayaku Co.

E: a dyestuff (trade name: Kayaset Black AN) produced by Nippon is Kayaku Co.

F: a pigment (trade name: Carbon Black 4818 Black 15F-7.5) produced by Dainichi Seika Co.

Example 20

Except that 2,2'-p-phenylenebis(3,1-benzoxazinon-4-one) as an ultraviolet light absorber was, added in an amount of 1.0 percent by weight in addition to the coloring matter, the same operations as those in Example 1 were repeated. The evaluation results of the optical characteristics of the obtained biaxially oriented polyester film are shown in Table 9.

Example 21

Except that 2,2'-p-phenylenebis(3,1-benzoxazinon-4-one) as an ultraviolet light absorber was added in an amount of 1.0 percent by weight in addition to the coloring matter, the same operations as those in Example 2 were repeated. The evaluation results of the optical characteristics of the obtained biaxially oriented polyester film are shown in Table 9.

Example 22

Except that 2-p-nitrophenyl-3,1-benzoxazinon-4-one as an ultraviolet light absorber was added in an amount of 1.0 percent by weight in addition to the coloring matter, the same operations as those in Example 3 were repeated. The evaluation results of the optical characteristics of the obtained biaxially oriented polyester film are shown in Table 9.

Example 23

Except that 2,2'-p-phenylenebis(3,1-benzoxazinon-4-one) as an ultraviolet light absorber was added in an amount of 0.5 percent by weight in addition to the coloring matter, the same operations as those in Example 4 were repeated. The evaluation results of the optical characteristics of the obtained biaxially oriented polyester film are shown in Table 9.

TABLE 9

|  | Thickness ($\mu$M) | Coloring matter (wt %) | Coloring matter (g/m$^2$) | Ultraviolet light absorber (wt. %) | Maximum absorption peak Wavelength (X) | Maximum absorption peak Half-value width | $T_x/T_{540}$ | $T_{450}/T_{540}$ | $T_{620}/T_{540}$ | Total light transmittance | Haze value | Contrast | Color purity | Hue deviation | Hue irregularity | Photodeterioration resistance |
|---|---|---|---|---|---|---|---|---|---|---|---|---|---|---|---|---|
| Example 20 | 75 | A(0.05) | 0.053 | U(1.0) | 594 nm | 32 nm | 0.27 | 1.23 | 1.23 | ○ | ◉ | ○ | ◉ | ◉ | ◉ | ◉ |
| Example 21 | 200 | B(0.02) | 0.056 | U(1.0) | 576 nm | 46 nm | 0.37 | 1.29 | 1.29 | ○ | ◉ | ◉ | ◉ | ◉ | ◉ | ◉ |
| Example 22 | 50 | A(0.04) | 0.028 | V(1.0) | 594 nm | 32 nm | 0.25 | 1.19 | 1.19 | ○ | ◉ | ○ | ◉ | ◉ | ◉ | ◉ |
| Example 23 | 75 | C(0.06) | 0.063 | U(0.5), V(0.5) | 585 nm | 44 nm | 0.22 | 1.02 | 0.99 | ○ | ◉ | ◉ | ◉ | ◉ | ◉ | ◉ |
| Example 1 | 75 | A(0.05) | 0.053 | None | 594 nm | 32 nm | 0.27 | 1.23 | 1.23 | ○ | ◉ | ◉ | ◉ | ◉ | ◉ | ○ |

Therein, the ultraviolet light absorbers designated by the marks U and V in Table 9 are the following compounds, respectively.

U: 2,2'-p-phenylenebis(3,1-benzoxazinon-4-one)

V: 2-p-nitrophenyl-3,1-benzoxazinon-4-one

Example 24

Except that 2,2'-p-phenylenebis(3,1-benzoxazinon-4-one) as an ultraviolet light absorber was added in an amount of 0.5 percent by weight in addition to the coloring matter, the same operations as those in Example 5 were repeated. The evaluation results of the obtained adhesive film are shown in Table 10.

Examples 25 to 27

Except that an adhesive layer was changed into a composition shown in Table 10, the same operations as those in Example 24 were repeated. The evaluation results of the obtained adhesive film are shown in Table 10.

TABLE 10

| | Composition for adhesive layer (percent by weight) | | | | | Reflection of back side | Frictional co-efficient | Refractive index of coating film in thickness direction | Surface roughness of coating film (nm) | Adhesive force | | Photo-deterioration resistance |
|---|---|---|---|---|---|---|---|---|---|---|---|---|
| | Aqueous polyester | Acrylic component | Bisamide component | Additive | Surfactant | | | | | Adhesive | Hard coat | |
| Example 24 | P1(75) | H(15) | — | — | Y1(10) | ○ | 0.75 | 1.559 | 10 | ○ | ◎◎ | ◎ |
| Example 25 | P2(80) | — | K2(5) | J3(10) | Y2(5) | ○ | 0.70 | 1.552 | 10 | ○ | ◎◎ | ◎ |
| Example 26 | P3(80) | — | K2(5) | J3(10) | Y2(5) | ○ | 0.78 | 1.55 | 9 | ◎ | ◎◎ | ◎ |
| Example 27 | P3(80) | — | K3(5) | J3(10) | Y2(5) | ○ | 0.69 | 1.549 | 9 | ◎ | ◎◎ | ◎ |
| Example 5 | P1(75) | H(15) | — | — | Y1(10) | ○ | 0.75 | 1.559 | 7 | ◎ | ◎◎ | ○ |

The marks (P2, P3, K1,K2, K3, J3 and Y2) of the compositions for the coating films in Table 10 are the following polymers or compounds, respectively.

Aqueous Polyester

P1: a copolyester (Tg=85° C.) produced from an acid component comprising 2,6-naphthalenedicarboxylic acid (70 percent by mole), isophthalic acid (24 percent by mole) and sodium 5-sulfoisophthalate (6 percent by mole) and a glycol component comprising ethylene glycol (90 percent by mole) and diethylene glycol (10 percent by mole).

P2: a copolyester (Tg=68° C.) produced from an acid component comprising terephthalic acid (90 percent by mole), isophthalic acid (6 percent by mole) and potassium 5-sulfoisophthalate (4 percent by mole) and a glycol component comprising ethylene glycol (95 percent by mole) and neopentyl glycol (5 percent by mole).

P3: a copolyester (Tg=47° C.) produced from an acid component comprising terephthalic acid (85 percent by mole) and isophthalic acid (15 percent by mole), and a glycol component comprising ethylene glycol (57 percent by mole), 1,4-butanediol (40 percent by mole), diethylene glycol (2 percent by mole) and polyethylene glycol (molecular weight: 600) (1 percent by mole).

Fatty Acid Amide, Fatty Acid Bisamide

K1: N,N'-methylenebisstearamide
K2: N,N'-ethylenebispalmitamide
K3: N,N'-ethylenebiscaprinamide

Additive

J3: acrylic resin fine particles (average particle diameter: 0.03 μm)

Surfactant

Y1: polyoxyethylene (N=7)lauryl ether
Y2: polyoxyethylenenonylphenyl ether

Example 28

The same operations as those in Example 9 were repeated except that an ultraviolet light absorber (2,2'-p-phenylenebis (3,1-benzoxazinon-4-one) in an amount of 1.0 percent by weight in addition to a coloring matter was added to a biaxially oriented polyester film. The evaluation results of the optical characteristics of the obtained hard coat are shown in Table 11.

Example 29

The same operations as those in Example 10 were repeated except that an ultraviolet light absorber (2,2'-p-phenylenebis(3,1-benzoxazinon-4-one) in an amount of 1.0 percent by weight in addition to a coloring matter was added to a biaxially oriented polyester film. The evaluation results of the optical characteristics of the obtained hard coat are shown in Table 11.

Example 30

The same operations as those in Example 11 were repeated except that an ultraviolet light absorber (2,2'-p,p'-diphenylenebis(3,1-benzoxazinon-4-one) in an amount of 1.0 percent by weight in addition to a coloring matter was added to a biaxially oriented polyester film. The evaluation results of the optical characteristics of the obtained hard coat are shown in Table 11.

Example 31

The same operations as those in Example 12 were repeated except that the first ultraviolet light absorber (2,2'-p-phenylenebis(3,1-benzoxazinon-4-one) in an amount of 0.5 percent by weight and the second ultraviolet light absorber (2,2'-p,p'-diphenylenebis(3,1-benzoxazinon-4-one) in an amount of 0.5 percent by weight in addition to a coloring matter were added to a biaxially oriented polyester film. The evaluation results of the optical characteristics of the obtained hard coat are shown in Table 11.

TABLE 11

| | Thickness (μM) | Coloring matter (wt %) | Amount of added coloring matter (g/m²) | Ultraviolet light absorber (wt %) | Evaluation as colored hard coat film | | | | | | | | |
|---|---|---|---|---|---|---|---|---|---|---|---|---|---|
| | | | | | Haze value | Contrast | Total light transmittance | Color purity | Hue deviation | Surface reflection | Abrasion resistance | Hue irregularity | Photo-deterioration resistance |
| Example 28 | 75 | A(0.05) | 0.0525 | U(1.0) | ◉ | ◉ | ○ | ◉ | ○ | ◉ | ○ | ◉ | ◉ |
| Example 29 | 200 | B(0.02) | 0.056 | V(1.0) | ◉ | ◉ | ○ | ◉ | ◉ | ◉ | ○ | ◉ | ◉ |
| Example 30 | 50 | A(0.04) | 0.028 | U(1.0) | ◉ | ◉ | ○ | ◉ | ○ | ◉ | ○ | ◉ | ◉ |
| Example 31 | 75 | C(0.06) | 0.063 | U(0.5), V(0.5) | ◉ | ◉ | ○ | ◉ | ◉ | ◉ | ○ | ◉ | ◉ |
| Example 9 | 75 | A(0.05) | 0.0525 | none | ◉ | ◉ | ○ | ◉ | ○ | ◉ | ○ | ◉ | ○ |

Hereinafter, Tables 9 to 11 will be considered. As clarified by Table 9, the biaxially oriented polyester films of the present invention to which the ultraviolet light absorbers had been added had excellent photo-deterioration resistance, and the adhesive films and the hard coat films of the present invention in which the biaxially oriented polyester films had been used, respectively, had also excellent photo-deterioration resistance.

As described above, the biaxially oriented polyester films, the adhesive films and the colored hard coat films, which each can enhance the color purity and the contrast without deteriorating the brightness of a display device, can be provided by the present invention. In addition, when improvement of the adhesive force and reduction of back side reflectance of the adhesive films and hard coat films of the present invention can be achieved, the hard coat films having good surface hardness, good abrasion resistance and so on, and further having sufficient transparency, glare resistance, explosion resistance, and so on, can be provided. Thereby, the biaxially oriented polyester films, adhesive films and colored hard coat films of the present invention are especially useful as surface-protecting plates for personal computer displays. Additionally, the optical biaxially oriented polyester films and adhesive films of the present invention can be applied not only to color CRT but also to display devices such as color LCD and color EL, to be adhered to image display surfaces, and can improve the color purities and contrasts of the displays.

What is claimed is:

1. A biaxially oriented polyester film characterized in that;
(1) said film contains a coloring matter;
(2) a haze value of said film is at most 5%;
(3) a wavelength (X) of the maximum absorption peak of light in wavelengths of 540 to 630 nm is in the range of 560 to 610 nm;
(4) a half band width of the maximum absorption peak of light in wavelengths of 540 to 630 nm is not more than 80 nm;
(5) a value ($T_x/T_{540}$), obtained by dividing a light transmittance ($T_x$) at the wavelength (X) of the maximum absorption peak of light in wavelengths of 540 to 630 nm by a light transmittance ($T_{540}$) at a wavelength of 540 nm, is less than 0.80;
(6) a value ($T_{620}/T_{540}$), obtained by dividing a light transmittance ($T_{620}$) at the wavelength of 620 nm by a light transmittance ($T_{540}$) at a wavelength of 540 nm, is in the range of 0.5 to 1.5;
(7) a value ($T_{450}/T_{540}$), obtained by dividing a light transmittance ($T_{450}$) at the wavelength of 450 nm by a light transmittance ($T_{540}$) at a wavelength of 540 nm, is in the range of 0.5 to 1.5; and
(8) said film is a base film for a hard-coated film to be laminated to an image display surface.

2. The biaxially oriented polyester film of claim 1, wherein $T_{620}/T_{540}$ and $T_{450}/T_{540}$ are in ranges of 0.7 to 1.3, respectively.

3. The biaxially oriented polyester film of claim 1 or 2, wherein said coloring matter is at least one coloring matter selected from the group consisting of anthraquinone-based coloring matters, quinacridone-based coloring matters, perinone-based coloring matters, polymethine-based coloring matters, pyrromethene-based coloring matters, porphyrin-based coloring matters and phthalocyanine-based coloring matters.

4. The biaxially oriented polyester film of claim 1 or 2, wherein said coloring matter is compounded in an amount of 0.004 to 0.420 g/m² based on an area of the biaxially oriented polyester film.

5. The biaxially oriented polyester film of claim 1 or 2, wherein the total light transmittance in wavelengths of 400 to 650 nm is not less than 40%.

6. The biaxially oriented polyester film of claim 1 or 2, which contains an ultraviolet light absorber.

7. The biaxially oriented polyester film of claim 6, wherein said ultraviolet light absorber is at least one compound selected from cyclic imino esters represented by the below-described Formula (1)

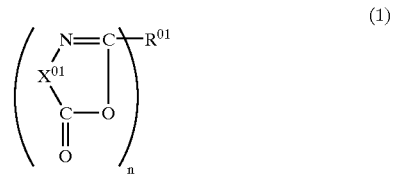

(1)

(wherein, $X^{01}$ is a divalent aromatic residue whose two bonds from $X^{01}$ represented in the above-described Formula (1) have the relation of the 1- and 2-positions; n is 1, 2 or 3; $R^{01}$ is an n-valent hydrocarbon residue, which may further contain heterogeneous atoms, or $R^{01}$ can be a direct bond, when n is 2), and the below-described Formula (2)

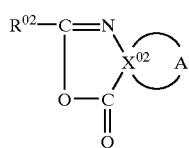

(wherein, A is a group represented by the below-described Formula (3) or the below-described Formula (4);

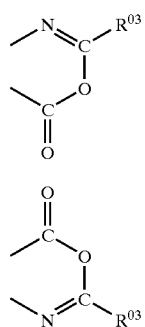

$R^{02}$ and $R^{03}$ are the same or different each other and are monovalent hydrocarbon residues, respectively; $X^{02}$ is a tetravalent aromatic residue, which may further contain heterogeneous atoms).

8. The biaxially oriented polyester film of claim 6, wherein the content of said ultraviolet light absorber is 0.1 to 5 percent by weight based on the weight of the biaxially oriented polyester film.

9. An adhesive film comprising: the biaxially oriented polyester film of claim 1 or 2, and a first adhesive layer disposed on at least one side of said film.

10. The adhesive film of claim 9, wherein the reflectance of incident light on an interface between the biaxially oriented polyester film and the first adhesive layer is not more than 0.4% based on the incident light.

11. A colored hard-coated film characterized in that
(1) said colored hard coat film comprises a transparent substrate film and a hard coat layer disposed on one side of the substrate film;
(2) said colored hard coat film contains a coloring matter;
(3) a wavelength (X) of the maximum absorption peak of light in wavelengths of 540 to 630 nm is in the range of 560 to 610 nm;
(4) a half band width of the maximum absorption peak of light in wavelengths of 540 to 630 nm is not more than 80 nm;
(5) a value ($T_x/T_{540}$), obtained by dividing a light transmittance ($T_x$) at the wavelength (X) of the maximum absorption peak of light in wavelengths of 540 to 630 nm by a light transmittance ($T_{540}$) at a wavelength of 540 nm, is less than 0.80;
(6) a value ($T_{620}/T_{540}$), obtained by dividing a light transmittance ($T_{620}$) at the wavelength of 620 nm by a light transmittance ($T_{540}$) at a wavelength of 540 nm, is in the range of 0.5 to 1.5;
(7) a value ($T_{450}/T_{540}$), obtained by dividing a light transmittance ($T_{450}$) at the wavelength of 450 nm by a light transmittance ($T_{540}$) at a wavelength of 540 nm, is in the range of 0.5 to 1.5; and
(8) said colored hard coat film is a hard coat film to be laminated to an image display surface.

12. The colored hard coat film of claim 11, having an sticking layer on the surface of the colored hard coat film on the side of the transparent substrate film.

13. The colored hard coat film of claim 12, wherein said sticking layer contains a colored matter.

14. The colored hard coat film of claim 12, wherein a colored layer is disposed between the transparent substrate film and the sticking layer, and said colored layer contains a colored matter.

15. The colored hard coat film of claim 11, having an anti-reflection layer on the surface of the colored hard coat film on the hard coat layer side.

16. The colored hard coat film of claim 15, having a stain-proofing layer on the surface of the colored hard coat film on the anti-reflection layer side.

17. The colored hard coat film of claim 11, wherein said transparent substrate film contains a coloring matter.

18. The colored hard coat film of claim 11, wherein said hard coat layer contains a colored matter.

19. The colored hard coat film of claim 11, wherein a colored layer is disposed between the transparent substrate film and the hard coat layer, and said colored layer contains a colored matter.

20. The colored hard coat film of claim 11, wherein the total light transmittance of visible light between wavelengths of 400 to 650 nm is not less than 40%.

21. The colored hard coat film of claim 11, wherein said coloring matter is at least one coloring matter selected from the group consisting of anthraquinone-based coloring matters, quinacridone-based coloring matters, perinone-based coloring matters, polymethine-based coloring matters, pyrromethene-based coloring matters, porphyrin-based coloring matters and phthalocyanine-based coloring matters.

22. The colored hard coat film of claim 11, wherein said transparent substrate film contains an ultraviolet light absorber.

23. The colored hard coat film of claim 22, wherein said ultraviolet light absorber is at least one compound selected from cyclic imino esters represented by the below-described Formula (1)

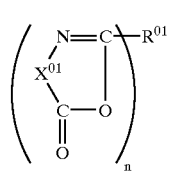

(wherein, $X^{01}$ is a divalent aromatic residue whose two bonds from $X^{01}$ represented in the above-described Formula (1) have the relation of the 1- and 2-positions; n is 1, 2 or 3; $R^{01}$ is an n-valent hydrocarbon residue, which may further contain one or more heterogeneous atoms, or $R^{01}$ can be a direct bond, when n is 2) and the below-described Formula (2)

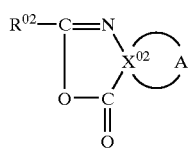

(2)

(wherein, A is a group represented by the below-described Formula (3) or the below-described Formula (4);

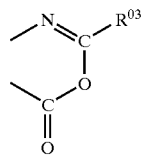

(3)

-continued

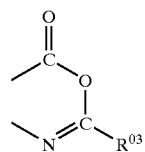

(4)

$R^{02}$ and $R^{03}$ are the same or different each other and are monovalent hydrocarbon residues, respectively; $X^{02}$ is a tetravalent aromatic residue, which may further contain heterogeneous atoms).

24. The colored hard coat film of claim 22, wherein a content of said ultraviolet light absorber is 0.1 to 5 percent by weight based on the weight of the transparent substrate.

\* \* \* \* \*